(12) United States Patent
Brown et al.

(10) Patent No.: US 7,584,251 B2
(45) Date of Patent: Sep. 1, 2009

(54) E-MAIL MESSAGING SYSTEM AND METHOD FOR ENHANCED RICH MEDIA DELIVERY

(76) Inventors: Scott T. Brown, 2477 Ajax Ct., Superior, CO (US) 80027; Kelly A. Wanser, 13043 Jackson Dr., Thornton, CO (US) 80241

( * ) Notice: Subject to any disclaimer, the term of this patent is extended or adjusted under 35 U.S.C. 154(b) by 1042 days.

(21) Appl. No.: 09/939,136

(22) Filed: Aug. 24, 2001

(65) Prior Publication Data

US 2002/0078158 A1    Jun. 20, 2002

Related U.S. Application Data

(60) Provisional application No. 60/228,382, filed on Aug. 28, 2000.

(51) Int. Cl.
*G06F 15/16* (2006.01)
*G06F 17/30* (2006.01)

(52) U.S. Cl. ............... 709/206; 709/246; 709/203; 709/217; 707/3; 707/10; 707/2; 707/4; 707/100

(58) Field of Classification Search .............. 709/217, 709/219, 203–206, 246, 226, 229; 380/255, 380/257, 258, 277, 59; 717/100, 106, 110; 713/1, 100, 150, 153, 154, 155, 161, 162, 713/178, 187, 200; 710/1; 719/310, 328, 719/329; 434/323, 118, 353; 705/14; 707/501, 707/10, 12

See application file for complete search history.

(56) References Cited

U.S. PATENT DOCUMENTS

| 5,487,100 | A |   | 1/1996  | Kane |
|---|---|---|---|---|
| 5,765,033 | A |   | 6/1998  | Miloslavsky |
| 5,818,447 | A | * | 10/1998 | Wolf et al. ............ 715/752 |
| 5,826,269 | A |   | 10/1998 | Hussey |
| 5,832,227 | A | * | 11/1998 | Anderson et al. ........ 709/224 |
| 5,867,495 | A | * | 2/1999  | Elliott et al. ............ 370/352 |
| 5,878,230 | A |   | 3/1999  | Weber et al. |
| 5,937,162 | A |   | 8/1999  | Funk et al. |
| 6,014,689 | A |   | 1/2000  | Budge et al. |
| 6,021,427 | A |   | 2/2000  | Spagna et al. |

(Continued)

OTHER PUBLICATIONS

Microsoft Corp., Microsoft Outlook—"Outlook Product Guide", May 29, 2001, Microsoft Corporatin.

(Continued)

*Primary Examiner*—Jude J Jean Gilles
(74) *Attorney, Agent, or Firm*—Pritzkau Patent Group, LLC

(57) ABSTRACT

A multi-user e-mail messaging system is described that is interfaced through the Internet and includes a first user group sharing a first server, which first server is interfaced to the Internet. In this system, after an e-mail message has been originated by an originating user of the first user group, the e-mail message is directed onto an e-mail enhancement path, and additional content is added to the e-mail message using the e-mail enhancement path to produce an enhanced e-mail message. Thereafter, the enhanced e-mail message from the e-mail enhancement path to the intended recipient. In one feature, the path taken by an incoming e-mail message is different from an outgoing path taken by an e-mail message sent from the first user group. The outgoing path defined to the intended recipient includes the enhancement path.

6 Claims, 30 Drawing Sheets

U.S. PATENT DOCUMENTS

| | | | |
|---|---|---|---|
| 6,044,395 | A | 3/2000 | Costales et al. |
| 6,073,142 | A | 6/2000 | Geiger et al. |
| 6,128,646 | A | 10/2000 | Miloslavsky |
| 6,137,489 | A | 10/2000 | Ohishi et al. |
| 6,175,857 | B1 | 1/2001 | Hachiya et al. |
| 6,185,606 | B1* | 2/2001 | Bereiter ............... 709/206 |
| 6,246,996 | B1 | 6/2001 | Stein et al. |
| 6,249,807 | B1 | 6/2001 | Shaw et al. |
| 6,250,930 | B1* | 6/2001 | Mintz ............... 434/323 |
| 6,272,485 | B1 | 8/2001 | Sragner |
| 6,298,445 | B1* | 10/2001 | Shostack et al. ......... 726/25 |
| 6,321,267 | B1* | 11/2001 | Donaldson ............ 709/229 |
| 6,360,221 | B1* | 3/2002 | Gough et al. ............ 707/10 |
| 6,487,584 | B1* | 11/2002 | Bunney ............... 709/206 |
| 6,553,407 | B1* | 4/2003 | Ouchi ............... 709/206 |
| 6,741,980 | B1* | 5/2004 | Langseth et al. ........... 707/2 |
| 6,965,926 | B1* | 11/2005 | Shapiro et al. ......... 709/219 |
| 2002/0078050 | A1* | 6/2002 | Gilmour ............... 707/9 |
| 2002/0078158 | A1* | 6/2002 | Brown et al. .......... 709/206 |
| 2002/0143855 | A1* | 10/2002 | Traversat et al. ....... 709/202 |
| 2002/0199095 | A1* | 12/2002 | Bandini et al. ......... 713/151 |
| 2003/0046533 | A1* | 3/2003 | Olkin et al. ............ 713/152 |
| 2004/0006706 | A1* | 1/2004 | Erlingsson ............. 713/200 |

OTHER PUBLICATIONS

FullSeven, Inc., FullSeven Lettermark—Product Description pp. 8-13, Jun. 28, 2001, FullSeven Technologies.

Metamail, Metamail—White Paper "Creating E-mail That Delivers", Apr. 16, 2001, Metamail Canada, Inc.

Buy-Request Corp., Logorilla—Product Description, May 15, 2001, Buy-Request Corp.

Zaplet, Inc., Zaplet Appmail—Product Description, May 18, 2001, Zaplet, Inc.

MindArrow, Inc., MindArrow Messenger—Product Description, Apr. 23, 2001, MindArrow, Inc.

Doubleclick, Inc., Doubleclick DARTmail—Product Description, Jul. 10, 2001, Doubleclick, Inc.

Responsys, Inc., Responsys Interact—Product Description, Dec. 11, 2000, Responsys, Inc.

MessageMedia, Inc., MessageMedia UnityMail—Product Description, Jul. 24, 2001, MessageMedia, Inc.

* cited by examiner

E-MAIL MESSAGING SYSTEM AND METHOD FOR ENHANCED RICH MEDIA DELIVERY

RELATED APPLICATION

The present application claims priority from U.S. Provisional Application No. 60/228,382, entitled METHOD AND APPARATUS FOR CONTENT RICH BULK EMAIL SERVICES, filed Aug. 28, 2000 under 35 U.S.C. §119(e).

BACKGROUND OF THE INVENTION

The present invention relates to e-mail messaging systems and, more specifically, to enhanced e-mail messaging systems that enable the generation and transmission of e-mail messages including rich media from standard multi-user e-mail messaging systems.

As the Internet has grown in popularity, businesses, consumers and private groups have adopted the Internet as an efficient, cost-effective, dynamic medium for delivering many types of content in a variety of formats. Web browsing is a commonly used aspect of the Internet that has grown in popularity due, in part, to the capability of presenting rich, multimedia content to interested parties. As is commonly known in the art, rich media is any combination of images, video, audio, formatting, animation, HTML, programmatic scripting and other functionality that can be delivered through a Web browser application. Rich media content can include, but is not limited to, graphics, audio, video, live data feeds from remote sites, interactive forms, purchasing mechanisms and other forms of content expression. As the variety of rich media content available to Web designers increases, companies, organizations and individuals have been quick to adopt Web interaction as a common form of communication.

Web browsing has a disadvantage in the communications realm in that the activity is passive and must await initiation of contact by a visitor. By contrast, e-mail aspects of the Internet provide for an active communications medium by which e-mail senders may initiate direct contact with e-mail recipients. By analogy, letters sent by traditional mail transmit information directly, person-to-person, business-to-business and company-to-consumer in contrast to passive media forms such as print, television and radio that await viewing by potential audience members.

E-mail is currently the most efficient communication medium available, and among the most revolutionary technological developments of the century. Its ubiquitous presence and rapid growth are largely attributable, like the Internet itself, to uniform technical standards. A major deficiency of e-mail when compared with Web content publishing, however, is that the most commonly used e-mail systems, i.e., multi-user e-mail messaging systems, have limited abilities to support the generation and transmission of e-mail messages that deliver rich media content into the viewing page of an e-mail message, that is, an enhanced or "rich media" e-mail message.

Electronic mail was originally developed to deliver text correspondence from one user to another on a computer network where a user is a member of an e-mail messaging system and may be a person, a machine or an application having an e-mail address within the domain of the e-mail messaging system. Its core technology is a server application designed to support activities such as the addressing of messages, transmission of messages to specified destination addresses, reception of messages from other servers, and storage of messages for viewing. A server is understood to be either a computer application designed to fulfill client requests or a piece of computer hardware configured to support such an application. The primary technology for e-mail is the TCP/IP communication protocol known as Simple Mail Transfer Protocol (SMTP). SMTP is the fundamental technology used in mail transport agents (MTAs), which are applications that send, receive and route e-mail messages on mail servers. While e-mail was originally designed to support the delivery of text messages, subsequent development produced potential support for rich media e-mail messaging through the Multipurpose Internet Mail Extensions (MIME) standard, which allows transmission of messages in several parts, including a part containing HTML, the current coding language for rich media content on the Internet at the present time.

The state of the art for generating and sending rich media e-mail is limited to applications and features of applications that allow users to compose rich media e-mail messages, or add rich media elements to e-mail messages, prior to initiating SMTP communication with a mail server (a "send" or "origination" event). This limitation currently restricts the incorporation of rich media into an e-mail message to the originating sender of the e-mail message. At present, there is no available method for centralized creation, administration and incorporation of rich media in messages sent from standard multi-user e-mail messaging systems.

Turning to the drawings, wherein like components are designated by like reference numerals throughout the various figures, attention is initially directed to FIG. 1. FIG. 1 illustrates a prior art multi-user e-mail messaging system 10 as commonly used today. In general, the multi-user e-mail messaging system is designed to continuously process inbound and outbound e-mail messages for multiple users distributed on a single network. System 10 includes a user PC 12, which supports an e-mail client 14, and a standard mail server 16 interfaced to the Internet 18. E-mail client 14 is configured to generate a rich media e-mail 20 and to transmit rich media e-mail 20 by an outbound path (indicated by arrows 22, 24, 26 and 28) via standard mail server 16 and Internet 18 to an intended recipient (not shown). Mail server 16 hosts user accounts, administration tools, a mail transport agent (MTA) and security features and communicates with e-mail client applications that allow users to send, receive and manage e-mail messages from their local computers. Inbound e-mail 30, arriving through an inbound path (indicated by arrows 32, 34, 36 and 38) via Internet 18, is also routed through mail server 16 and e-mail client 14 to be received at user PC 12. As shown in FIG. 1, in a standard multi-user e-mail messaging system, e-mail messages are composed and sent from e-mail clients that direct messages to a central mail server that sends messages to end-recipient domains through an open connection to the Internet. Subsequent progress has extended the capabilities of multi-user messaging systems to include diverse functions such as tools for organization and workgroup collaboration, enhanced security features and sophisticated user tools for e-mail clients.

Continuing to refer to FIG. 1, current solutions for sending rich media e-mail from standard multi-user e-mail messaging systems are designed for e-mail client applications, i.e., for sender-specified incorporation of rich media content into e-mail messages where specification is made prior to an original send event. E-mail client 14 is an example of a client application which is a PC-based e-mail application.

An example of a widely used, PC-based e-mail client application in operation today is Microsoft Outlook™, which includes features that enable senders to include rich media content and formats in messages as they compose them. One such feature, commonly known as "Stationery", is primarily designed to allow users to select backgrounds and fonts for their messages, but can also be used to incorporate other rich media content into them. Using the Stationery or standard features such as Insert/Picture or Insert/File, rich media elements can be inserted directly into messages by the user originating the e-mail message. However, the large file size of most rich media elements poses numerous potential problems for networks and user systems arising from the weight of e-mail messages containing such rich media elements, and such origination of rich media e-mail messages by individual users is generally discouraged and/or disabled by technical administrators of e-mail messaging systems.

A number of PC-based e-mail client add-on applications are available from third party software vendors to allow users to add rich media content to e-mail messages prior to sending them.

One solution, Lettermark™ produced by FullSeven, attempts to solve some of the problems associated with delivering centrally administrated rich media content in e-mail using Outlook Stationery. An application installed on a user's PC bridges communication between a central administration server and a user's Outlook application to deliver standardized rich media templates in user's e-mail messages. For purposes of the present application, rich media templates are defined as individual sets of predefined software code containing formatting instructions and other specifications for rich media content that will deliver rich media content into the body of an e-mail message when the message is viewed by a recipient.

The solution presents a number of difficulties for users, design constraints based on the limitations of elements that can be incorporated in the composition pane, and myriad complications limiting effective activity tracking.

Another solution, produced by MetaMail™, uses a PC-based publishing application to create an XML message attachment, incorporating a sender's text message, which is presented to recipients of a standard e-mail message. The solution requires recipients to have installed a proprietary PC plug in "reader" application to view the rich media message.

Yet another solution, Logorilla 2.0 Pro™ by Logorilla™, uses a PC application to send e-mail messages directly from an individual user's PC to a customized mail server, bypassing the standard mail server, where the user's uploaded logo image and pre-defined header text are appended to the top of the text portion of the user's e-mail messages.

Still another solution, offered by a now-defunct company known as Epidemic Marketing™ used a PC application that inserted HTML code into e-mail messages that enabled them to display rich media advertisements in the right-hand margin of e-mail messages.

Another solution, offered by the now-defunct companies Supersig™ and Favemail™ used a PC application that installed a script to automate the insertion of certain types of rich media content into the signature portion of the body of mail message.

These PC-based e-mail client add-on solutions share several important deficiencies. For example, content elements displayed during the composition process add significant bandwidth burden to local networks; content elements inserted prior to an original send event clog sender networks, recipient networks and recipient in-boxes. Also, the operation of many of these applications introduces security risks to otherwise highly-protected e-mail systems. Furthermore, significant changes to users' customary operation of their e-mail applications results in poor adoption rates, inconsistent use and high rates of error; implementation across a user base is prohibitively resource intensive across all but the smallest user networks, and support for user-intensive methods is difficult and costly. In addition, updates to content elements and upgrades of application features are difficult, expensive and inconsistent, and the integrity of rich media content design across a user base cannot be ensured. Moreover, secure, private tracking of send traffic and other activity is nearly impossible.

In one prior art method, which is enabled in current versions of Microsoft Outlook e-mail client application, a user creates an HTML page to insert into an e-mail message as the message is composed. This method solves the problem of inserting large rich media files directly into the message by using computer code that "calls" rich media elements into the message from a publicly accessible location on the Internet only when the message is viewed by a recipient. That is, rich media elements do not travel through the network and user systems with the e-mail message itself but are called into the e-mail message upon viewing by a message recipient. HTML can be inserted into the e-mail message, for example, as a stored selection in the Outlook Stationery file or by using the Insert/File/Insert As Text selection in the e-mail composition window. This HTML method requires expertise well beyond that of most general users of e-mail and is fraught with pitfalls arising from the differential treatment of rich media content by various recipient e-mail platforms. Any effort to centrally create rich media content for delivery through e-mail using the features of Microsoft Outlook requires distribution and continuous updating of HTML templates across the PCs of users of the system, along with changes in users' practices to accommodate the incorporation of text messages in HTML template frames. Furthermore, comprehensive measurement and monitoring of the system is prohibitively resource intensive. Consequently, effective use of Outlook tools for this purpose across an e-mail system user base is very difficult.

Due at least in part to the above listed factors, the use of Microsoft Outlook or any current PC-based e-mail client to generate rich media e-mail for any purpose is rare, and the widespread use of any current PC-based e-mail client application to centrally administer rich media content for e-mail generated by users of a standard e-mail messaging system is not foreseen.

Turning now to FIG. 2, in conjunction with FIG. 1, an example of an e-mail messaging system 100 including Web-based e-mail applications as an alternative to PC-based e-mail client applications is illustrated. Like system 10 shown in FIG. 1, system 100 includes a user PC 112, which in this case supports a Web-based e-mail client 114. E-mail client 114 is configured to generate a Hypertext Transfer Protocol (HTTP) post 115 (including no rich media content) by an outbound path (indicated by arrows 117 and 119) to a Web mail application 121, which is located remotely from user PC 112. Web mail application 121 hosts a processing application 123 which generates a rich media e-mail 127. Web mail application 121 further includes a standard mail server 116 which directs rich media e-mail via Internet 18 to the intended recipient (not shown).

A small number of companies offer Web-based e-mail applications with specialized rich media e-mail capabilities. The Web-based e-mail client on such e-mail systems enables the use of selected rich media (e.g., HTML graphic ads) in the generation, transmission and display of e-mail messages. For example, service providers can permit individual users to include some type of rich media content when a user is logged into a personal account on the service provider's proprietary system.

A first example of such an application, Appmail™ by Zaplet™, enables users to select one of a number of interactive collaboration tools for delivery to recipients via e-mail from a web-based e-mail sending MTA, which cannot receive inbound messages. These collaboration tools are served from a central source, and information entered into them by e-mail recipients is updated each time a recipient message is opened.

A second example of such an application is Messenger™ by MindArrow™. This application enables users to select one of a number of rich media e-mail templates, compose a text message and send the resulting rich media e-mail to recipients from the web-based system, which cannot receive inbound messages.

A third example of the web-based application for rich media e-mail, formerly offered by Kefta as Keftamail™ and now available open source as kmail, offers users the ability to include advertisements or pictures in the body of e-mail messages they send from ordinary Web mail user accounts.

In the first two cases, the web-based client is used in conjunction with a sending MTA, rather than a fall multi-user e-mail messaging server. In all three cases, the systems are proprietary, stand-alone systems that do not provide the full set of desirable features of standard multi-user e-mail messaging systems and are not designed to allow user interaction to extend their features to those systems.

Turning now to FIG. 3, a bulk e-mail messaging system 200 for generation and delivery of rich media e-mail messages is illustrated. System 200 includes a user administrator PC 212, which supports a highly specialized, administrative application 214. Administrative application 214 generates an HTTP post or API call 215, which is directed through an outbound path (indicated by arrows 217 and 219) to a bulk mail application 221. Bulk mail application 221 includes a bulk mail server 222 as well as a processing application 223, which generates a rich media e-mail 227. Rich media e-mail 227 is directed through bulk mail server 222 via Internet 18 to the intended recipient (not shown).

The most common solutions for generating rich media e-mail have been designed for "bulk e-mail messaging systems", which include high volume outbound delivery MTAs and accompanying user tools designed to allow specialized, administrative users to create e-mail messages for delivery to a large population of recipients. Such systems are designed to support intermittent transmission of "one-to-many" e-mail messages and do not process inbound messages for users. These systems also generally include substantial features for compiling and maintaining lists of e-mail recipients and their characteristics and capabilities for assigning the delivery of particular messages to sets of recipients based on specified characteristics (i.e., "targeting"). Some systems also include capabilities for generating messages by dynamically combining content elements based on recipient characteristics (for example, such a function can be incorporated into processing application 223).

Many of today's leading bulk e-mail messaging systems support the creation and delivery of rich media e-mail and include administrative tools that allow users to import and store HTML code and rich media content elements that will together create a rich media e-mail message, to assign content elements to messages based on recipient characteristics, to centrally store and remotely serve content elements into e-mail pages when messages are viewed (in the same way that web pages deliver content elements when they are viewed) and to track activity by logging the activation of content elements as they are viewed, clicked on, or engaged in other types of interaction with e-mail recipients. Examples of bulk e-mail messaging systems that deliver rich media e-mail include DARTmail™ produced by DoubleClick, Unitymail™ produced by MessageMedia, and Interact™ produced by Responsys.

A critical aspect of the generation of rich media e-mail in the environment of a bulk e-mail messaging system is the unity of the transmission of the message with the creation or insertion of rich media content. While pre-designed content elements may be stored and re-purposed, the rich media content and any text elements of a message generally are parts of a single embodiment, a message designed for broadcast to an audience, generated or administered by a sender responsible for the assignment of content and transmission of the message. That is, flexibility of message content is difficult in such bulk e-mail messaging systems and, like the PC-based client e-mail applications described earlier, centralized administration of the rich media content across messages generated by a wide user base is problematic. Furthermore, bulk e-mail messaging systems are stand-alone applications that do not support standard activities required for multi-user correspondence messaging. Additionally, the rich media capabilities of these bulk e-mail messaging systems cannot be applied to e-mail operations that fulfill the purposes of standard e-mail messaging systems.

The present invention provides an enhanced e-mail messaging system for rich media delivery which serves to reduce or eliminate the foregoing problems in a highly advantageous and heretofore unseen way and which provides still further advantages.

SUMMARY OF THE INVENTION

As will be disclosed in more detail hereinafter, there is disclosed herein a method and associated system for use in a multi-user e-mail messaging system interfaced through the Internet and including at least a first user group sharing at least a first server, which first server is, in turn, interfaced to the Internet such that any user of the first user group may send an e-mail message for transfer to an intended recipient selected as at least one of (i) another user in the first user group and (ii) a remote user interfaced to the Internet by a connection other than the first server. The method includes the steps of, after the e-mail message has been originated by an originating user of the first user group, directing the e-mail message onto an e-mail enhancement path, adding additional content to the e-mail message using the e-mail enhancement path to produce an enhanced e-mail message, and, thereafter, directing the enhanced e-mail message from the e-mail enhancement path to the intended recipient.

In another aspect of the invention, there is disclosed a configuration for use in the aforedescribed multi-user e-mail messaging system. The configuration includes an arrangement for adding additional content to the e-mail message and an arrangement for routing the e-mail message to the arrangement for adding additional content, after the e-mail message has been originated by an originating user of the first user group, to add the additional content thereby producing an enhanced e-mail message. The configuration further includes an arrangement for directing the enhanced e-mail message to the intended recipient.

In yet another aspect of the invention, the configuration includes a first auxiliary server for directing the e-mail message to a first location, after the e-mail message has been originated by an originating user of the first user group. The configuration further includes, at the first location, a second auxiliary server for adding additional content to the e-mail message to produce an enhanced e-mail message and, thereafter, for directing the enhanced e-mail message to the intended recipient. In one feature, the first auxiliary server may be configured for receiving an inbound e-mail message intended for transfer to any user of the first user group. In another feature, the first auxiliary server may be further configured for routing the inbound e-mail message to one of a plurality of processing stations. In still another feature, the first auxiliary server may be surrounded by a firewall, with the second auxiliary server located inside the firewall. Alternatively, the second auxiliary server may be located outside the firewall.

In still another aspect of the invention, there is disclosed a configuration for use in the aforedescribed multi-user e-mail messaging system. The e-mail messaging system includes an arrangement for allowing an originating user of the e-mail message to add a request for desired additional content to the e-mail message, for providing a validation of the request for desired additional content according to a set of desired criteria, and for directing the e-mail message to a specified location. The configuration further includes an arrangement for performing additional processing located at the specified location configured for adding the desired additional content to the e-mail message, responsive to the validation, to produce an enhanced e-mail message, and for redirecting the enhanced e-mail message to the intended recipient.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
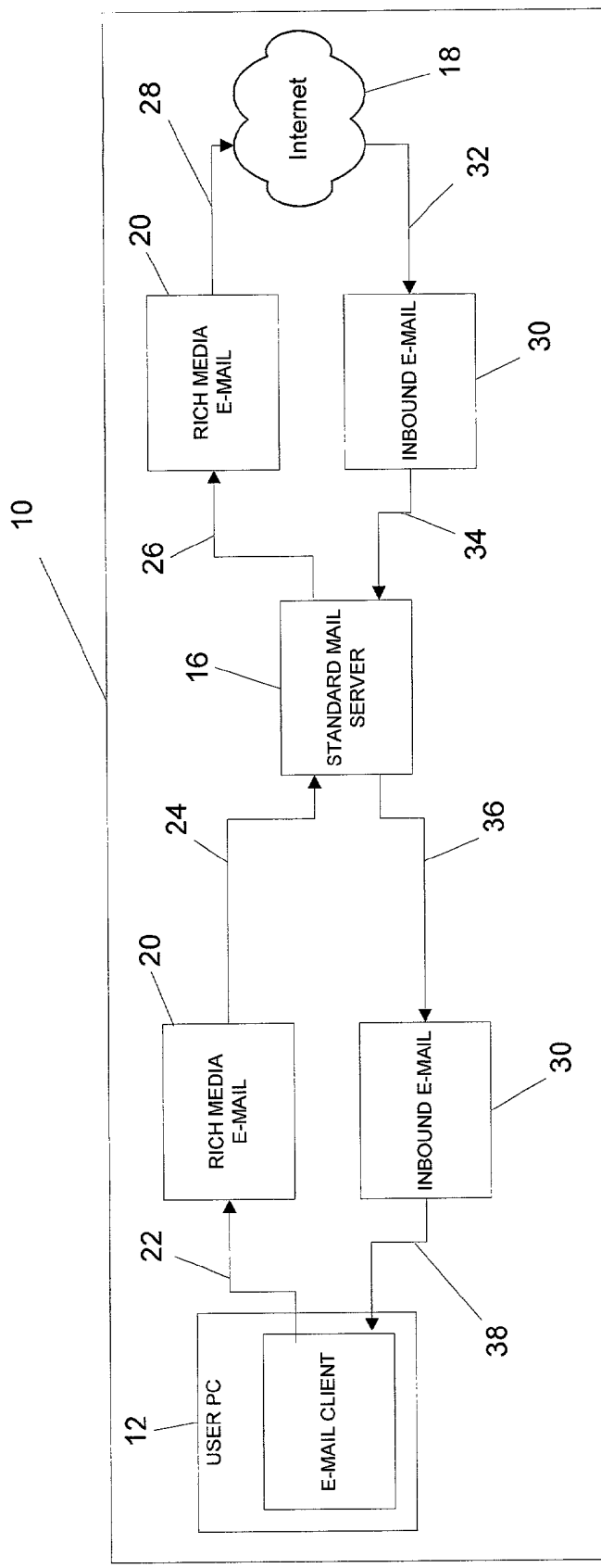
FIG. 1 is a block diagram of a prior art multi-user e-mail messaging system including a PC-based e-mail client add-on application for the addition of rich media content to e-mail messages.

Because e-mail messages sent from standard e-mail messaging systems are aggregated at the mail server, the most attractive solutions for the centralized incorporation and administration of rich media content in e-mail messages would operate on, or in conjunction with, the e-mail server. Currently, none of the mail servers supporting standard multi-user e-mail messaging systems ("standard mail servers"), including the industry's top five applications: Ipswitch iMail™, qmail, which is an open source application, Lotus Notes™, Microsoft Exchange™ and Novell Groupwise™, provide any capabilities for centrally adding, modifying or otherwise administrating rich media content for e-mail messages traveling through them. Additionally, no separate application exists that would operate in conjunction with a standard mail server to centrally add and administrate rich media content across populations of messages traveling though it.

Today, most e-mail is sent from standard multi-user e-mail messaging systems owned and operated by organizations of various sizes, most frequently for purposes related to the objectives of these organizations. In fact, e-mail messages are often the most voluminous and frequent form of contact that many organizations have with the outside would. It is desirable for organizations that operate e-mail systems to leverage this contact medium by enhancing text-based e-mail messages with rich media content to deliver branding, information, solicitations, opportunities for interaction and other content in the population of e-mail messages traveling from their systems. In the context of the present patent application, enhancing is understood to be the performance of any type of modification to an e-mail message for adding rich media content to the e-mail message. These modifications include, but are not limited to, adding or altering any of the following elements: text content, header data, formatting, graphics, security features, attachments, or computer code designed to perform alterations.

To practically incorporate rich media in e-mail messages sent by their users, e-mail system operators should provide centralized capabilities for the creation, administration, and incorporation of rich media content in the population of messages sent from the system. Additional desirable capabilities include a process to generate rich media e-mail messages that are light weight, secure and viewable by every existing e-mail client application, a means of differentiating between internal (to the network) and outbound (from the network) messages in the administration of rich media content, an ability to measure and track activity generated by the delivery of rich media content, an efficient system for hosting and serving rich media content elements, and tools to support effective design for various recipient viewing platforms.

The present invention recognizes that the variety of technical activities required for the administration and delivery of rich media into e-mail messages and the desirability of executing certain component activities outside of a local network make it desirable not only to capture messages from an e-mail server and redirect them to a first process, but to use a first process to efficiently and/or selectively redirect messages to a second distinct process (FIG. 4), where redirection is any form of electronic transmission apart from programmatic transfer within a single application, prior to sending them on to intended recipients. There are no current or prior methods for doing so, for any purpose.

In view of the above discussion it can be seen that the need exists for a new application for the centralized delivery of rich media content through e-mail messages generated from standard multi-user e-mail messaging systems.

Accordingly, the present invention also recognizes the need for a method and system for the centralized generation, administration and delivery of rich media e-mail from standard multi-user e-mail messaging systems that produces and delivers lightweight e-mail messages that flawlessly combine sender-generated messages with centrally specified rich media content in a format in which the resulting messages can be efficiently received and viewed by any recipient operating any type of e-mail client application.

The present invention further recognizes that it is desirable to provide a method and system for capturing messages originated from any standard multi-user e-mail messaging system after an original send event, but prior to departure from the system, and redirecting them to a first and second process for the centralized insertion of rich media content, where such a system is able to distinguish between messages sent to other users of the same e-mail messaging system ("internal messages") and those sent to recipients outside the user's e-mail messaging system ("outbound messages").

In addition to the forgoing recognitions, Applicants note that it would be desirable to provide a method and system for centralized users to electronically create, modify and delete rich media content elements and templates for e-mail messages and administrate their application on, and/or availability to, populations of e-mail messages traveling from an individual e-mail messaging system.

Moreover, Applicants are aware that the present invention provides a highly advantageous method and system for measuring the volume of e-mail messages sent from an e-mail messaging system to another process for the purpose of adding rich media content, and tracking and measuring the delivery of content elements to recipients and any interactive activity generated by those elements.

It is further desirable, as recognized by the present invention, to provide a PC-based tool for individual users of an e-mail messaging system that allows them to specify, from within their existing e-mail client processes, rich media content formats from among those that are created and made available by centralized administrators of rich media content for the e-mail messaging system.

E-mail Systems, Clients and Servers

Figure 4:
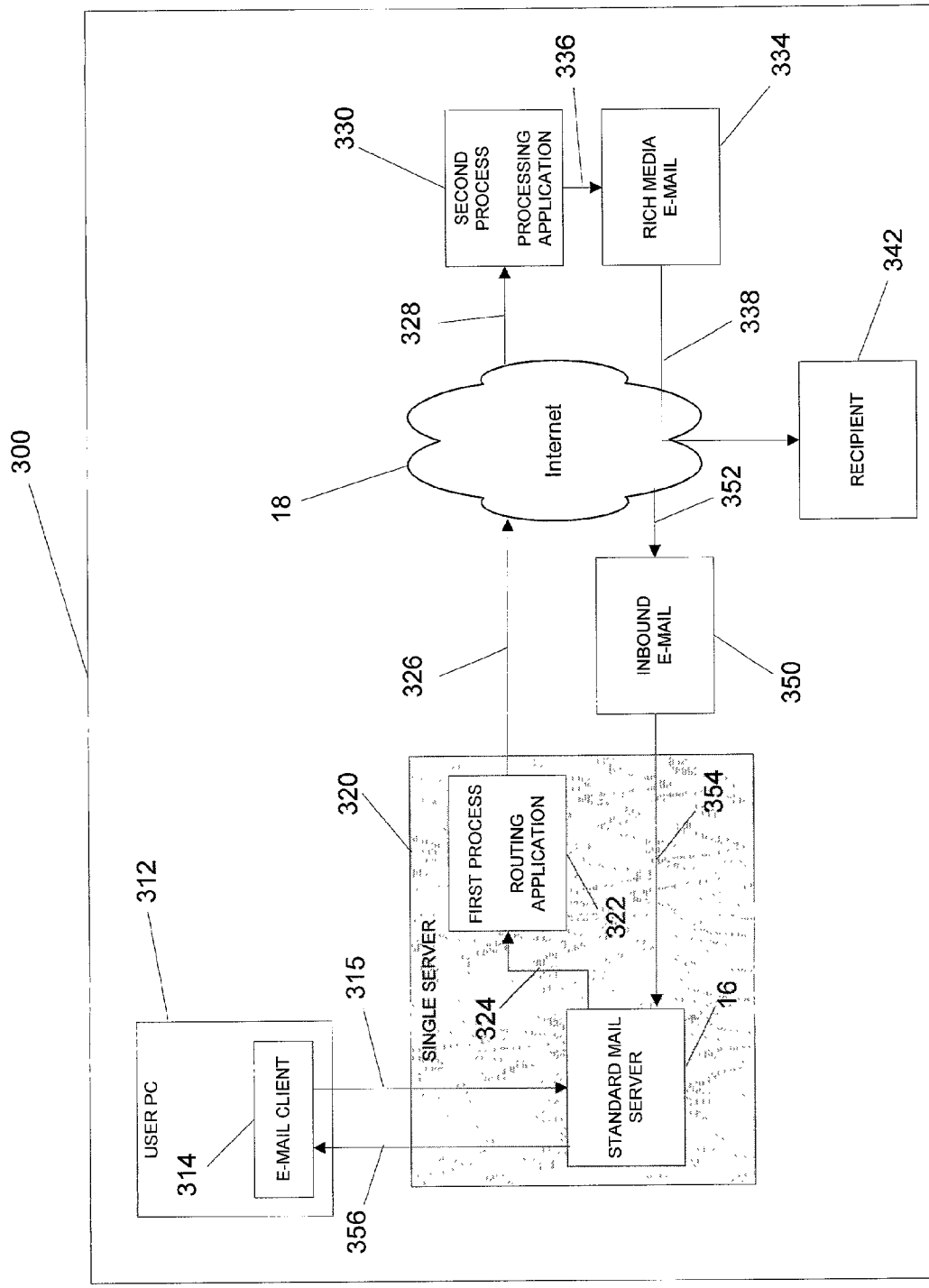
FIG. 4 is a block diagram of an e-mail messaging system for enhanced rich media delivery manufactured in accordance with the present invention, shown here to illustrate general aspects of its highly advantageous structure.

Turning now to FIG. 4, an e-mail messaging system 300 for enhanced rich media delivery manufactured in accordance with the present invention is illustrated. As described previously, rich media is understood to be any combination of images, video, audio, formatting, animation, HTML, programmatic scripting and other functionality that can be delivered through a Web browser application. System 300 includes a user PC 312, which supports an e-mail client 314. In one embodiment, e-mail client 314 of the present invention is configured to provide user selection capabilities for rich media content enhancements. E-mail client 314 can include, for example, a client plug-in software also preferred to herein as "add-in" designed to provide the aforementioned user selection capabilities.

For example, when an originating user (not shown) working on user PC 312 originates an outbound e-mail message (not shown) intended for delivery to an intended recipient, the outbound e-mail message is initially processed at e-mail client 314 then sent on to a standard mail server 16 through an outbound path (partly indicated by arrow 315). in the embodiment shown in FIG. 4, standard mail server 16 is hosted in a single server 320, which also includes a routing application 322 as a first process. Standard mail server 16 directs the outbound e-mail message to routing application 322 through a continuation of the outbound path (indicated by arrow 324). Routing application 322 continues processing of the outbound e-mail message as required to eventually add rich media content to the outbound e-mail message. For example, information can be added to the outbound e-mail message to indicate the types of enhancements desired. Further, routing application 322 modifies the destination address for the outbound e-mail message to, in effect, redirect the message through Internet 18 to a processing application 330 as a second process, where processing application 330 is located remotely from single server 320. Processing application 330 then utilizes the information in the outbound e-mail message received from routing application 322 and constructs a rich media e-mail 334 according to information contained in the outbound e-mail message. Rich media e-mail 334 is configured to include the content of the original, outbound e-mail message as well as saved information regarding the original, intended recipient. Rich media e-mail 334 is then directed via Internet 18 to a recipient 342, which is the original, intended recipient. The latter may include any user interfaced to the Internet, including a user within the group connected to single server 320 or a user interfaced to the Internet via a connection other than single server 320, as is illustrated by the present example. By contrast, inbound e-mail 350 received through Internet 18 is delivered via mail server 16 to e-mail client 314 using, for example, standard TCP/IP SMTP, POP and IMAP protocols without, necessarily, going through the first process or the second process.

It should be appreciated that user PC 312 comprises one PC within a user group, each of which PCs is connected to server 320. The remaining group PCs have not been shown for purposes of illustration clarity.

In general, e-mail client 314 generates an outbound e-mail message, including user-specified template selection criteria, and forwards the outbound e-mail message to mail server 16. Mail server 16 then directs the outbound e-mail message to routing application 322. Routing application 322 modifies and annotates or tags the original message to indicate the type of rich media desired for addition to the outbound e-mail message prior to transmission to the originally intended recipient. This tagged or annotated message is then forwarded via Internet 18 to processing application 330. Processing application 330 interprets the tags and annotations in the outbound e-mail message to generate rich media e-mail 334 including to the original text in the outbound e-mail message enhanced with desired rich media content. The newly generated, rich media e-mail 334 is then directed via Internet 18 to recipient 342, which is the original, intended recipient.

Those of ordinary skill in the art will recognize, in view of this disclosure, that the various processes depicted in FIG. 4 can be distributed over a wide variety of computing devices. Such distributed client/server applications allow for these processes to be distributed over a number of computing devices or to be co-resident within fewer computing devices.

Figure 5:
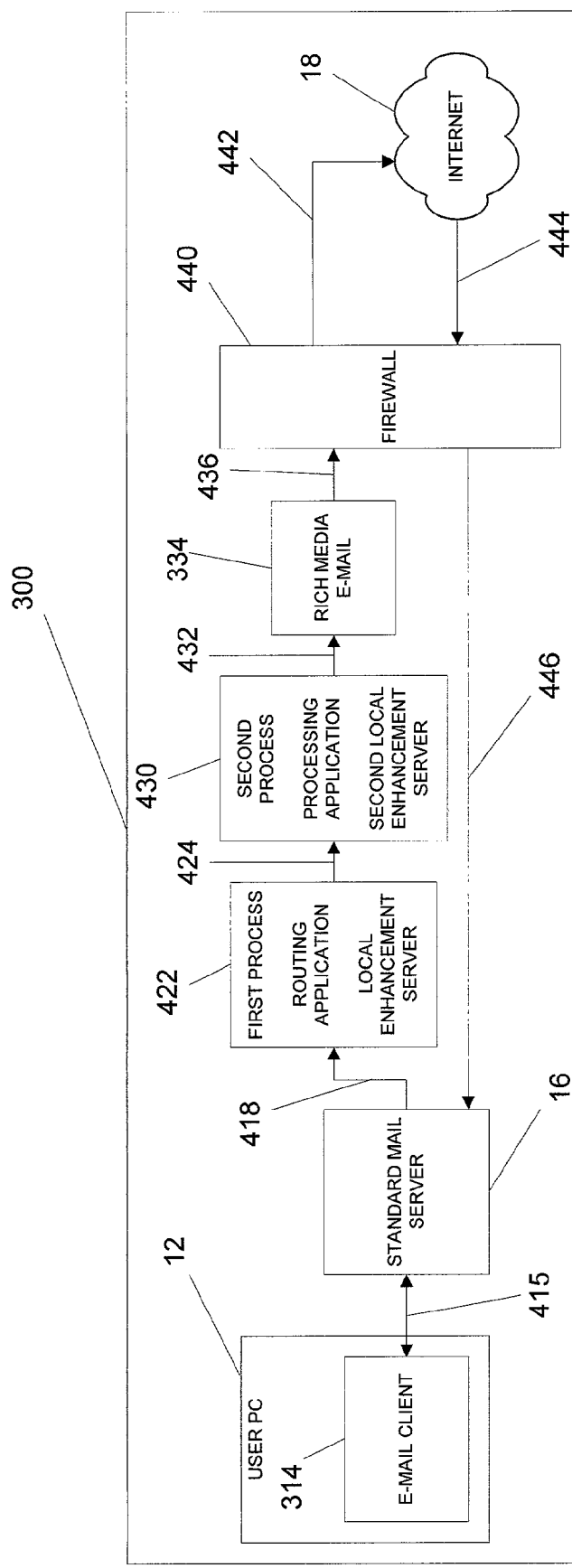
FIG. 5 is a block diagram of one embodiment of the e-mail messaging system of the present invention including a firewall positioned between the standard mail server and the Internet such that the rich media e-mail is produced on the mail server side of the firewall.
Figure 6:
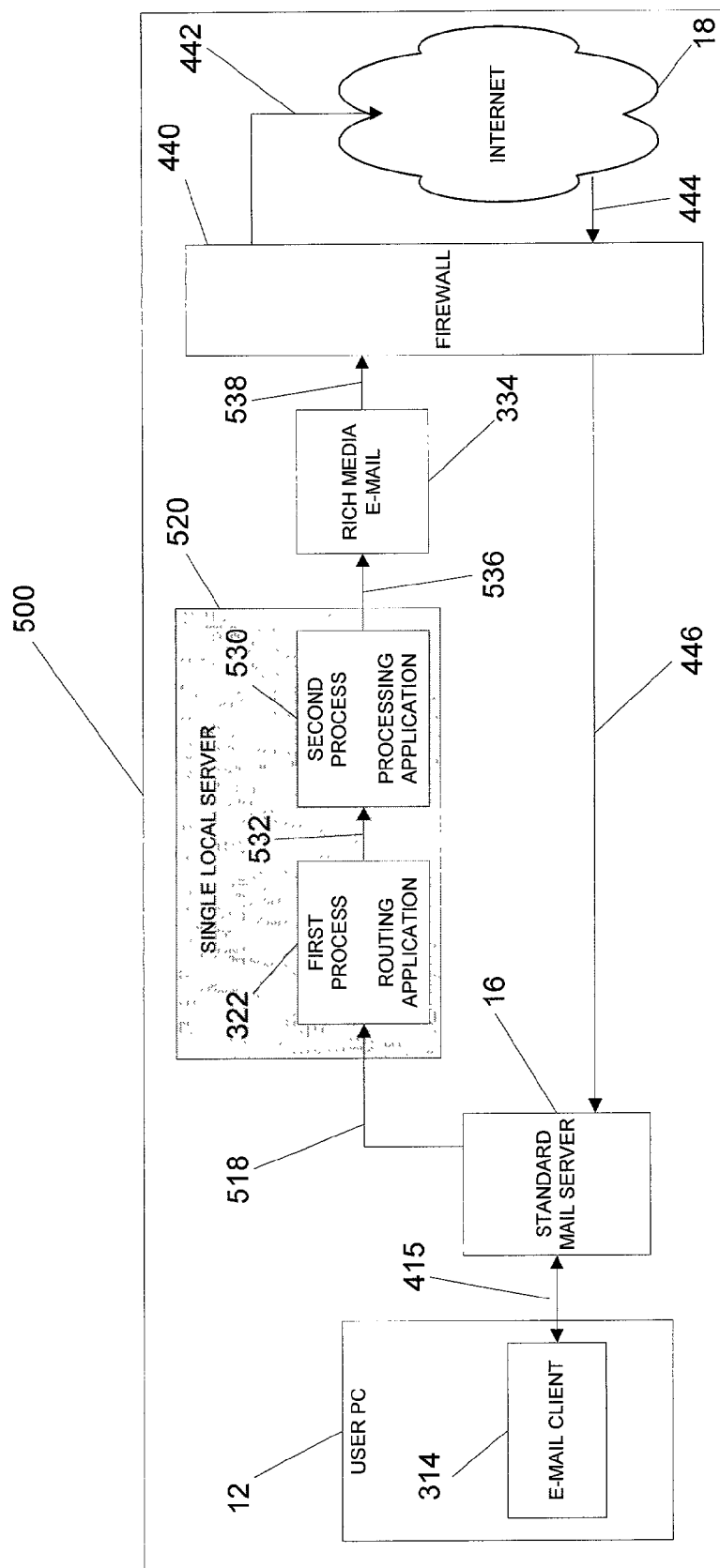
FIG. 6 is a block diagram of another embodiment of the e-mail messaging system of the present invention including a firewall positioned between the standard mail server and the Internet such that the rich media e-mail is produced in a single, combined process on the mail server side of the firewall.
Figure 7:
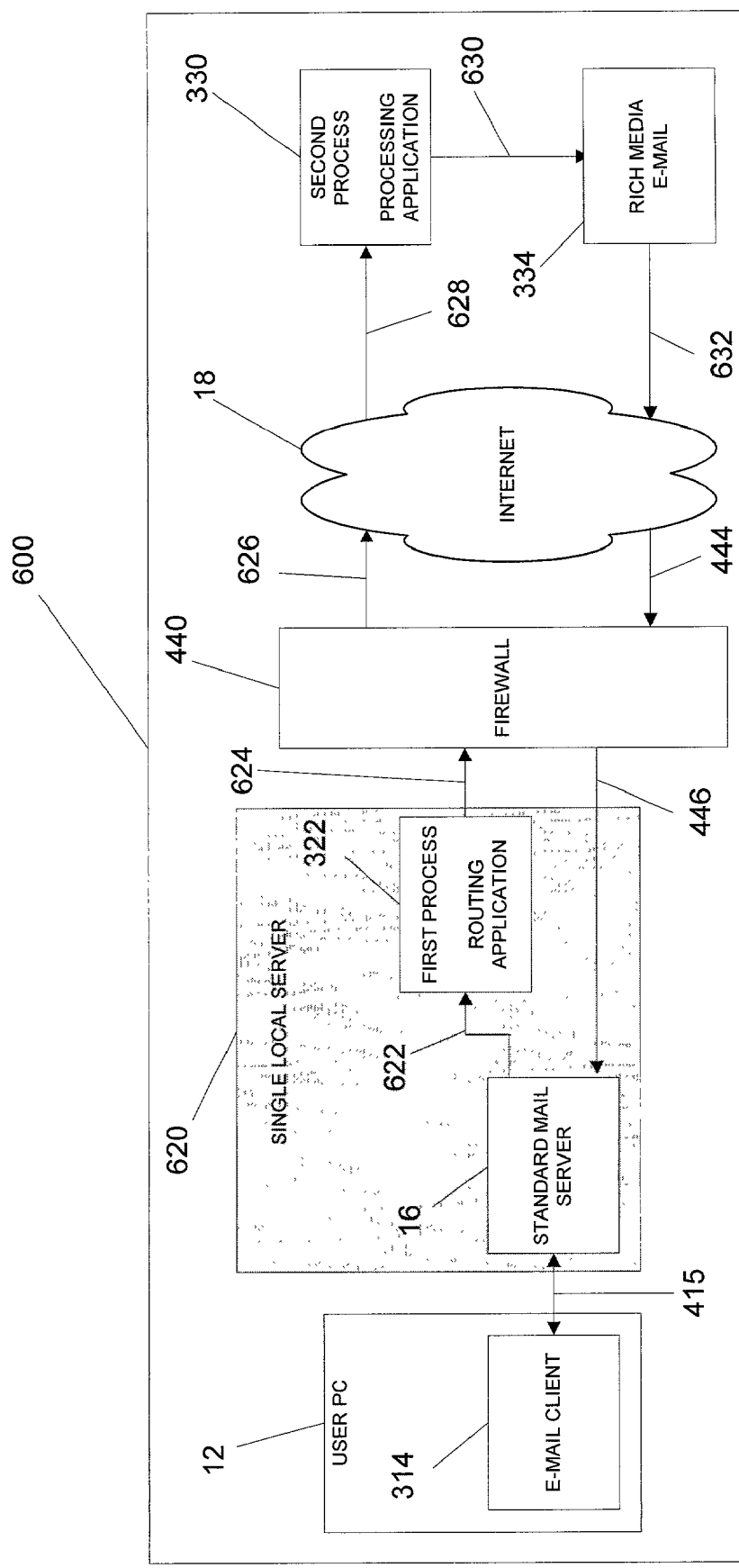
FIG. 7 is a block diagram of yet another embodiment of the e-mail messaging system of the present invention including a firewall positioned between the standard mail server and the Internet such that the process by which the rich media e-mail is produced is split inside and outside of the firewall.
Figure 8:
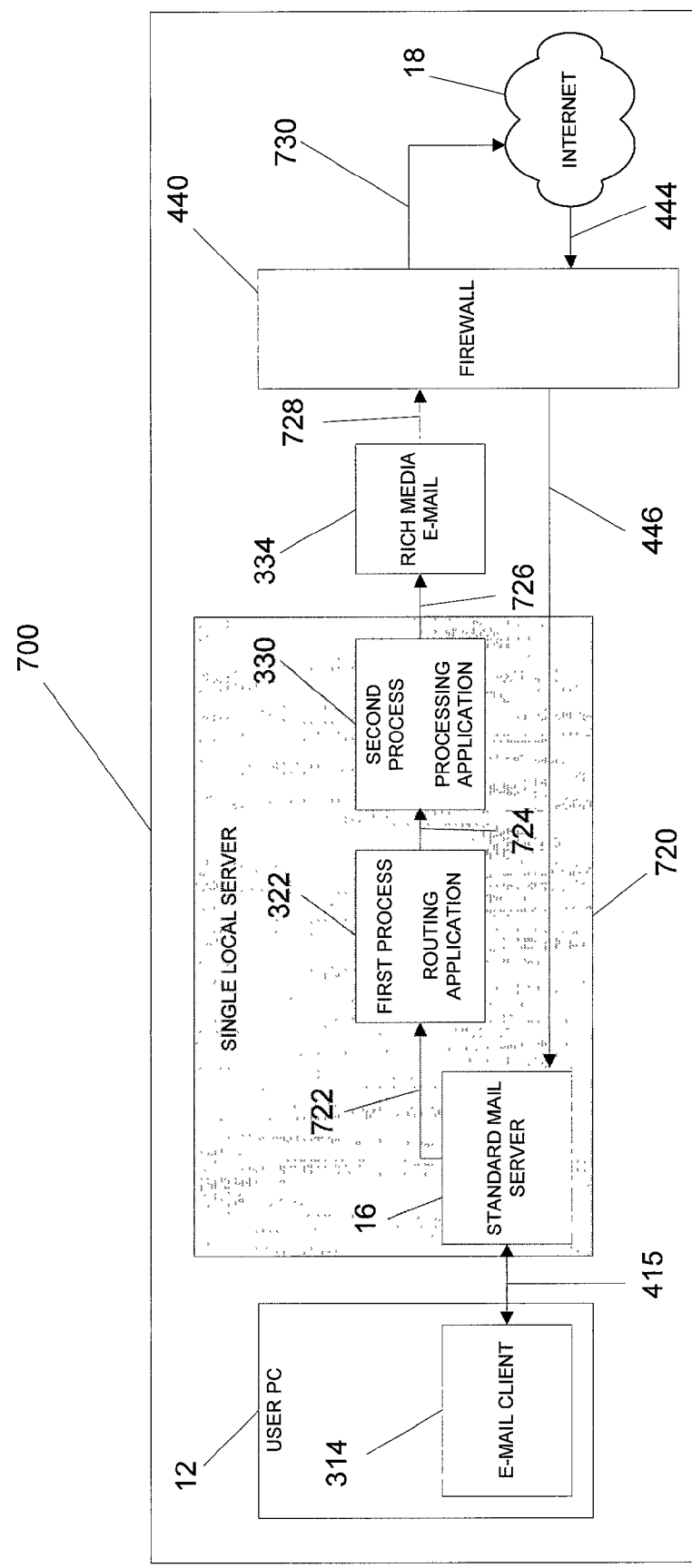
FIG. 8 is a block diagram of one embodiment of the e-mail messaging system of the present invention including a firewall positioned between the standard mail server and the Internet such that the rich media e-mail is produced on the mail server side of the firewall in a single process, which includes the standard mail server, routing application and processing application.

Those of ordinary skill in the art will also recognize that, in an alternative embodiment, routing application 324 may forward outbound e-mail messages to a processing application 530 located within a firewall 440 as shown in FIG. 5. It is to be understood that the term "local" refers to proximity with respect to network topology and need not necessarily refer to physical proximity such that the local server process must be of necessity co-resident with e-mail client programs. Furthermore, as used herein, a local network consists of computer hardware connected to an electronic communications network operating within a single communication gateway to the Internet, i.e., a firewall. Moreover, a firewall may be referred to as "surrounding" the components which it serves to protect or isolate. Similarly, in another embodiment as shown in FIG. 6, the routing application and processing application can be integrated on a single local server located within firewall 440. In yet another embodiment illustrated in FIG. 7, the routing application (first process) and the standard mail server can be integrated as a single local server that selectively modifies and directs e-mail messages to a processing application (second process) for enhancement with rich media content. In still another embodiment shown in FIG. 8, the routing application, the processing application and the standard multi-user e-mail server may be integrated as a single local server with rich media enhancement features built into the single local server.

Such alternative embodiments may be appropriate in particular environments. In one embodiment, the aforedescribed features to produce rich media e-mail are divided between a local enhancement server, containing the routing application, and an external enhancement server, containing the process application, where the term "external" refers to a location with respect to network topology that is outside the firewall, or single communication gateway, of a local electronic communications network. This embodiment is desirable for providing the enhancement as a hosted service delivered by a service provider through the Internet. The present invention is intended to broadly cover all technical architecture embodiments that may be deployed by one of ordinary skill in the art, so long as there is consistency with the teachings herein.

Local Enhancement Server Process

In one embodiment of the present invention, as illustrated in FIG. 4 and described above, an e-mail message generated by the originating user is first transmitted to the server process local to the user's network.

In general, he local server process receives e-mail messages generated by an e-mail client program and delivered by the e-mail server. The local server then modifies the e-mail message to include any locally specified rules for rich media enhancement. Specifically, the local enhancement server process will check for the presence of an enhancement "tag" (information to permit a subsequent external enhancement server process to add desired rich media content which may have been added by a user plug-in) and, where none is present, modify the e-mail message to include a tag and then forward the message to the e-mail enhancement server. This embodiment reduces the volume of data transmitted from the originating user's system (the computer on which the e-mail client is operating) via the network for generating rich media e-mail messages. The local enhancement server modifies the original message to include tags or annotations that add little to the volume of data in the e-mail message, then forwards the message to an external enhancement server. The external enhancement server adds the bulk of additional data representing the desired rich media content and then forwards the message with the additional volume of rich media content data to its originally intended recipients. This architecture defers the transmission of larger volumes of content rich data to an external server that selectively may have has higher bandwidth connections to the Internet as compared to the system on which the user's client process and the local enhancement server may operate. This architecture also preserves the security of the network e-mail server by placing interactive rich media content applications in an independent environment.

Those of ordinary skill in the art will recognize that an equivalent architecture, produced in accordance with these teachings, allows for the fall volume of enhanced rich media content to be added by a local rich media enhancement server thereby obviating a need for the external enhancement server. However, an additional benefit of the embodiment described above arises in that the external enhancement services can be provided as a service accessible through the Internet to a wide variety of users with varying needs for volumes of e-mail and richness of message content.

Figure 9:
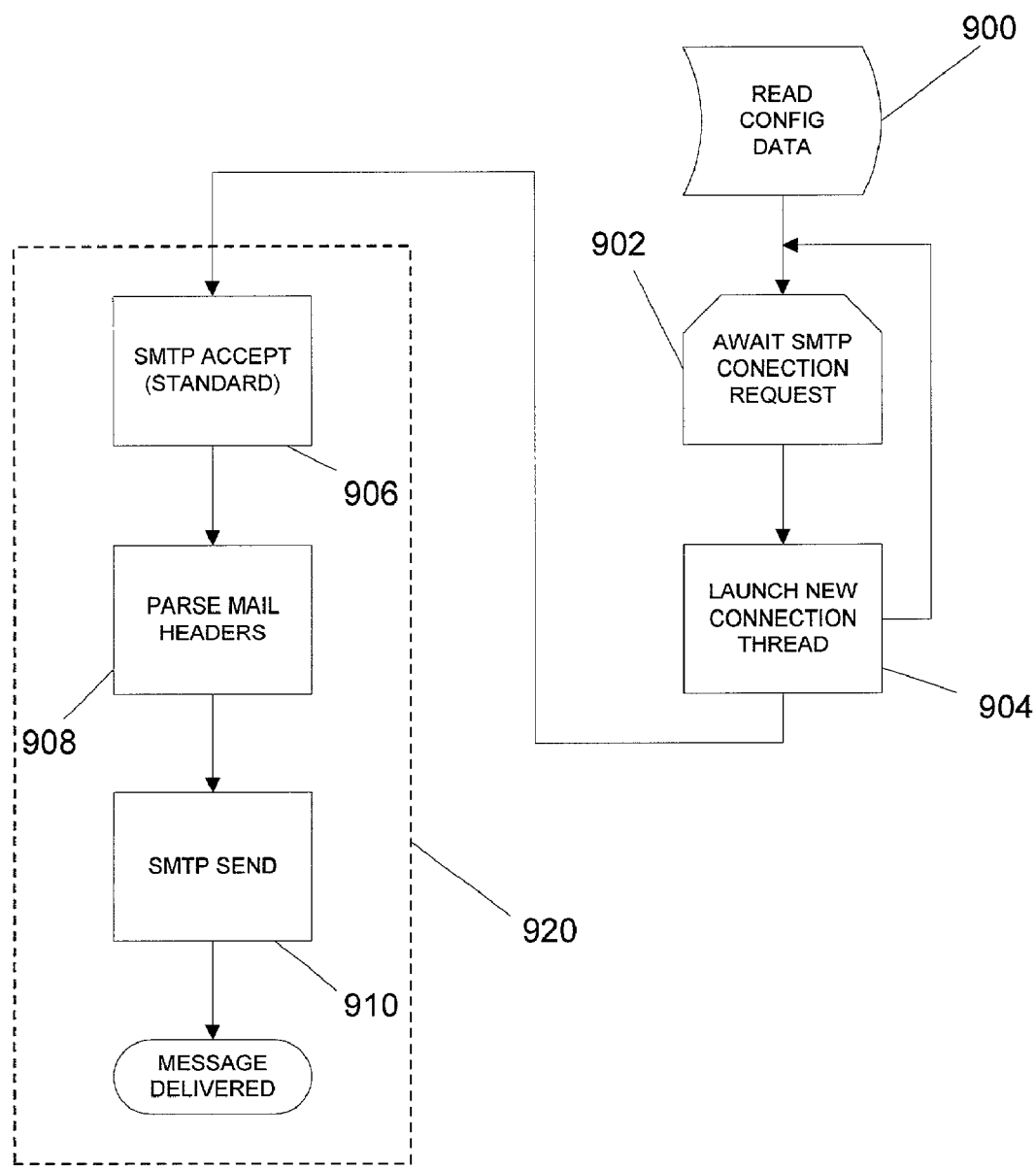
FIG. 9 is a flow diagram illustrating one method for implementation of the routing application in the e-mail messaging system for enhanced rich media delivery in accordance with the present invention.

FIG. 9 is a flow diagram illustrating a high-level conceptualization of first process 322 as shown in FIG. 4. Initially, a configuration file is read in step 900, where the configuration file provides information such as TCP/IP addresses and ports associated with operation of the enhanced e-mail systems. For example, the e-mail server in an enhanced e-mail network may transmit e-mail messages to a distinct IP address and/or to a distinct TCP/IP port number in order to provide requisite connectivity between the e-mail server and the local enhancement server process described here.

In one embodiment, a configuration file is structured in a format similar to that of typical Windows-based application programs. As sample configuration file contains sections and entries as follows:

[External]
out_port=25
out_server=211.212.213.214

[Client]
customize_internal=0
name=My Company, Inc.
id=12345678
company=12345678
domain=mydomain.net
restrict_sender=1
allow_list=john,paul,george,ringo

[System]
smtp_debug=0
classpath=C:/Program Files/application_name
maxheap=48m
minheap=16m

[Internal]
in_server=127.0.0.1
in_port=26

[Listen]
listen_server=211.212.213.215
listen_port=25

The sections and variables of the exemplary configuration file have the following semantic:

External

This section contains information specific to the external delivery of messages to the e-mail enhancement server.

| | |
|---|---|
| out_port | The port number used for SMTP communication with the e-mail enhancement server. |
| out_server | The IP address of the primary e-mail enhancement server. |

Client

This section relates to the information stored about each installation of the local server.

| | |
|---|---|
| customize_internal | A Boolean flag that tells the server if it should add rich media content to messages that stay within the e-mail network. |
| Name | The client name. |
| id | The default template ID for the organization. A default template ID must be present to handle e-mail client applications that do not have the PC Application ("add-in"). May contain multiple values separated by "," (e.g. 00000000,11111111) |
| company | The Company ID that is assigned for each client. This must be present in order to track activity by company. |
| domain | The name of all domains sending or receiving e-mail on this network. May contain multiple values separated by "," (e.g. Mydomain.com, Mydomain.net) Used to determine if the sender is internal or external to the domain. |
| restrict_sender | A Boolean flag to tell the local e-mail server if there is a restriction on who can send enhanced messages. This functionality is critical to a smooth roll out within an organization. |
| allow_list | The "," (comma) separated list of users that are allowed to send enhanced e-mail messages. |

System

This section holds the information specific to the operation and tuning of the local enhancement server.

| | |
|---|---|
| smtp_debug | A Boolean flag to display the log file and debug information in realtime. Critical to safe operation in an enterprise but slows the system. |
| classpath | File path to the Java Classes |
| maxheap | The starting memory heap grabbed by the JVM at launch. |
| minheap | The minimum memory heap size reserved by the JVM |

Internal

This section holds the information specific to the sending of messages inbound to the e-mail server. Used to handle local error messages and transport of inbound messages.

| | |
|---|---|
| in_server | The IP address of the network e-mail server. |
| in_port | The TCP/IP port that the network mail server is listening to for connections. |

Listen:

This section holds the information specific to listening for connections from the network e-mail server and the Internet.

| | |
|---|---|
| listen_server | The public facing IP address of the e-mail network. |
| listen_port | The TCP/IP port that the local e-mail enhancement server is listening to for connections. |

Initialized with such configuration information, step 902 then listens on the specified IP address and port for initiation of SMTP connections from one or more enhanced e-mail server processes.

In response to such a connection request, step 904 launches an independent thread 920 to process the specific SMTP requests from the established connection with a particular client. Specifically, step 906 performs a standard SMTP "accept" operation to accept a request for delivery of a message. Step 908 then parses the e-mail header information and modifies the information as required to forward the original e-mail message to the external e-mail enhancement server for reconstruction of the message as a rich media enhanced e-mail message. Details of the parsing of, and modifications to, the original message are provided further herein below. Step 910 then transmits the modified original message to the external e-mail enhancement server using standard SMTP "send" operations. Each independent thread 920 processes appropriate requests for a particular connection from the e-mail server. The thread terminates when the associated SMTP connections is closed by the connecting server process.

Those of ordinary skill in the art will recognize that the multithreaded architecture shown in FIG. 9 is intended merely as exemplary of one of many design choices know to those of ordinary skill in the art. Other equivalents structures and methods will be readily apparent to those of ordinary skill in the art for providing services on behalf of multiple connection processes operating in parallel.

Figure 10:
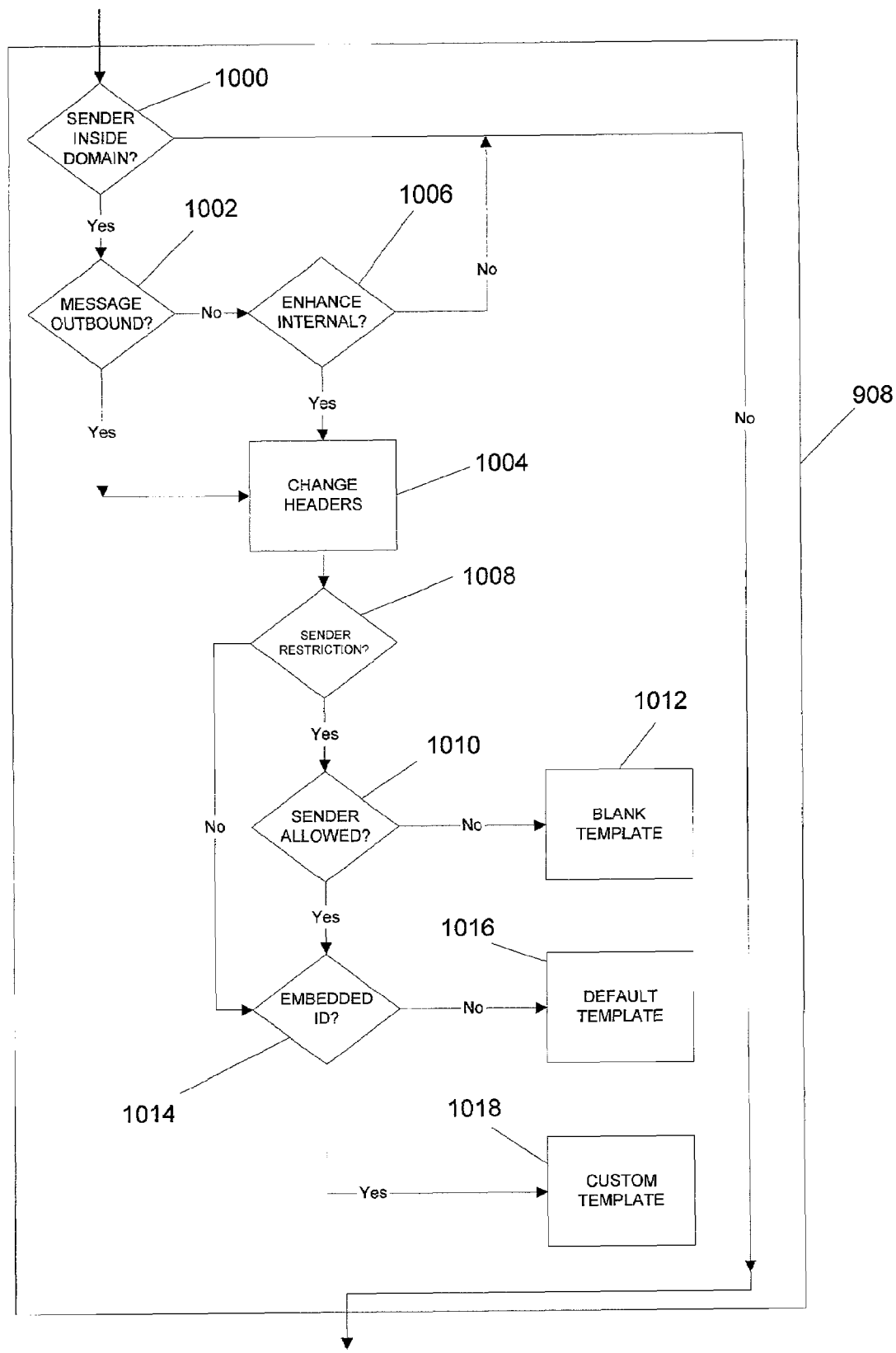
FIG. 10 is a flow diagram illustrating the details of step 908 of FIG. 9 for mail header parsing initially shown in FIG. 9.

FIG. 10 is a flow diagram providing additional details of step 908 of FIG. 9 to parse header information in the original e-mail message generated by the enhanced client. In addition to parsing information in the original e-mail message headers, the original message is annotated and tagged for further processing by the external e-mail enhancement server responsible for ultimately adding the desired rich media content to e-mail messages.

The method of FIG. 9, described above, allows for different e-mail enhancements to be provided based on the network proximity of the intended recipients and the original sender of the message. For example, if the message originates from inside a particular computing network and the destination is intended as outside the network, one set of rules for adding rich media content may apply. A different set of rules for adding rich media content may apply when the orginator is inside the network and the intended recipients are also inside the same network.

Step 1000 first determines whether the sender (originator) of the original e-mail message is within the domain on which this server process is operating (i.e., within the same computing network defined domain boundaries). If the sender is not within the operating domain of the server process, the message being processed is from outside the domain and hence an inbound message on which no further processing is necessary. If the message is from inside the domain of the local enhancement server process, step 1002 determines whether the message is outbound to an external recipient or inbound from another internal sender. If the message is in fact outbound as determined in step 1002, step 1004 changes the headers of the original message as discussed in further detail herein below. If the message is inbound from another user within the same internal domain as the server process, step 1006 determines whether such internal messages were specified for rich media content enhancement. If rich media content enhancement is not indicated, the method is completed and no further processing of the message is required. If it is determined in step 1006 that enhancement of internal e-mails is enabled, step 1004 changes the header information of the original message as described in further detail herein below. In general, step 1004 changes the headers of the e-mail message to save the present addressing information and then modify the "to" and "from" fields to direct the modified message to the external e-mail enhancement server. The email message is directed to an email enhancement path that operates on the e-mail message, which includes a header section that contains information regarding the originating user and the intended recipient, to alter the e-mail message by separating and modifying the header section in a predetermined way by inactivating the information regarding the originating user and intended recipient contained in the header section and adding an alternate header section containing active information regarding an alternate sender and an alternate message recipient. Details of step 1004 are provided herein below.

After step 1004 has changed header information within the original e-mail message, steps 1008 through 1018 then determine which, if any, rich media template is to be used for enhancing the original e-mail message. Specifically, step 1008 first determines whether the configuration parameters of the process restrict all senders from using the enhanced rich media e-mail features. If there is no such restriction as determined by step 1008, processing continues with step 1014 as discussed below. If such restrictions are presently configured in the local enhancement server process, step 1010 then determines whether the particular sender of this message is restricted from using rich media templates. In one embodiment, if this user is not allowed to use such enhanced e-mail features, a blank template is selected in step 1012 for further processing of the e-mail message by the enhanced message server. Such a blank template can be configured to supply no rich media content modifications to the original e-mail message but rather to leave the message essentially untouched in its original form.

If it is determined during steps 1008 and 1010 that the particular sender is permitted to use rich media enhancements for the e-mail messages, step 1014 determines if there is a specific template ID already selected by the sender that originated the message. For instance, a user may be permitted to select a particular rich media template for enhancement of any particular outbound message. If the user has chosen not to select a particular template, step 1016 applies a default template specification configured for operation of the process. If it is determined in step 1014 that a particular template ID has been selected by the sender of the original message, step 1018 selects that particular custom template identified by the sender of this message.

Selection of an appropriate template in step 1012, 1016 or 1018 can be recorded in the modifications of the header information in the original message to identify the selected template for further processing in the external e-mail enhancement server as discussed further herein below.

Figure 11:
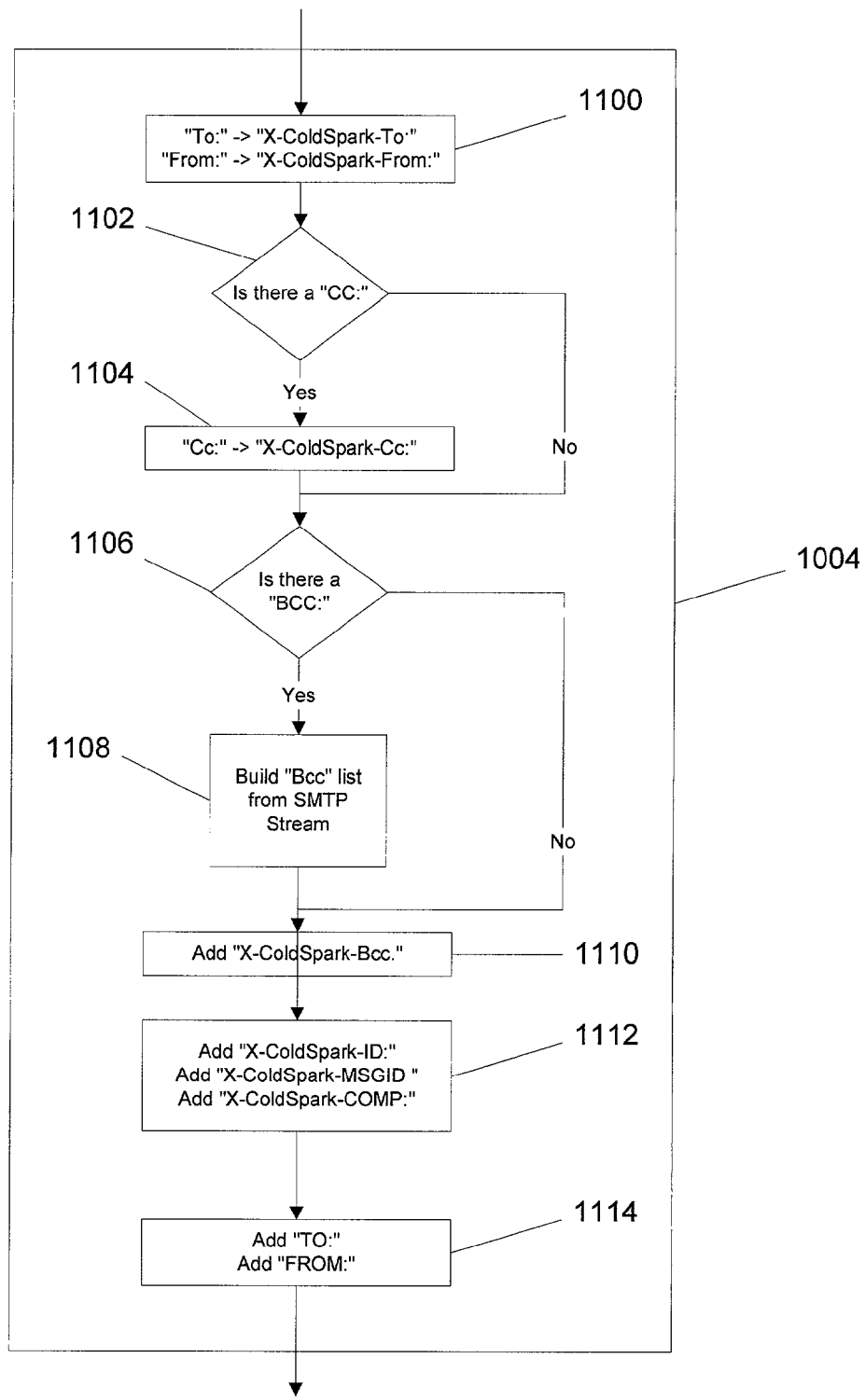
FIG. 11 is a flow diagram illustrating the details of step 1006 of FIG. 10 for saving and modifying elements of the header of the original e-mail message in order to forward the modified message to the external e-mail enhancement server initially shown in FIG. 10.

FIG. 11 is a flow diagram illustrating additional details of step 1004 of FIG. 10 to save and modify elements of the header of the original e-mail message in order to forward the modified message to the external e-mail enhancement server. In one embodiment, step 1100 saves the original "to" and "from" fields of the original message in associated tags in the extended message header. The original "to" and "from" fields are saved in tagged fields of the modified original message for later restoration by the external e-mail enhancement server process. Steps 1102 and 1104 similarly save the "cc" field in the original e-mail message if such fields present. Specifically step 1102 determines whether such a "cc" field is present in the original message and, if the "cc" field is present, step 1104 saves the value of the fields in a tagged entry in the header structure of the modified original message.

In like manner, steps 1106 through 1110 save any "bcc" recipients that were requested during the standard SMTP accept 902 as seen in FIG. 9. Specifically step 1106 determines whether the e-mail server has requested any "bcc" recipients and, if "bcc" recipients have been requested, steps 1108 and 1110 build a list of such "bcc"requests and save the constructed list in a tagged field in the header of the modified original message. Step 1112 then adds additional tagged fields corresponding to additional information required by the external enhancement server process to complete the transformation of the original message into the appropriate rich media e-mail message. Lastly, step 1114 adds a modified "to" and "from" field to the header structure of the modified original message. The modified "to" and "from" fields are used to designate that the modified message is to be transmitted to the external enhancement server process. As discussed further herein below, the external enhancement server restores the original "to" and "from" information to forward the rich media e-mail message to the intended recipient.

Figure 12:
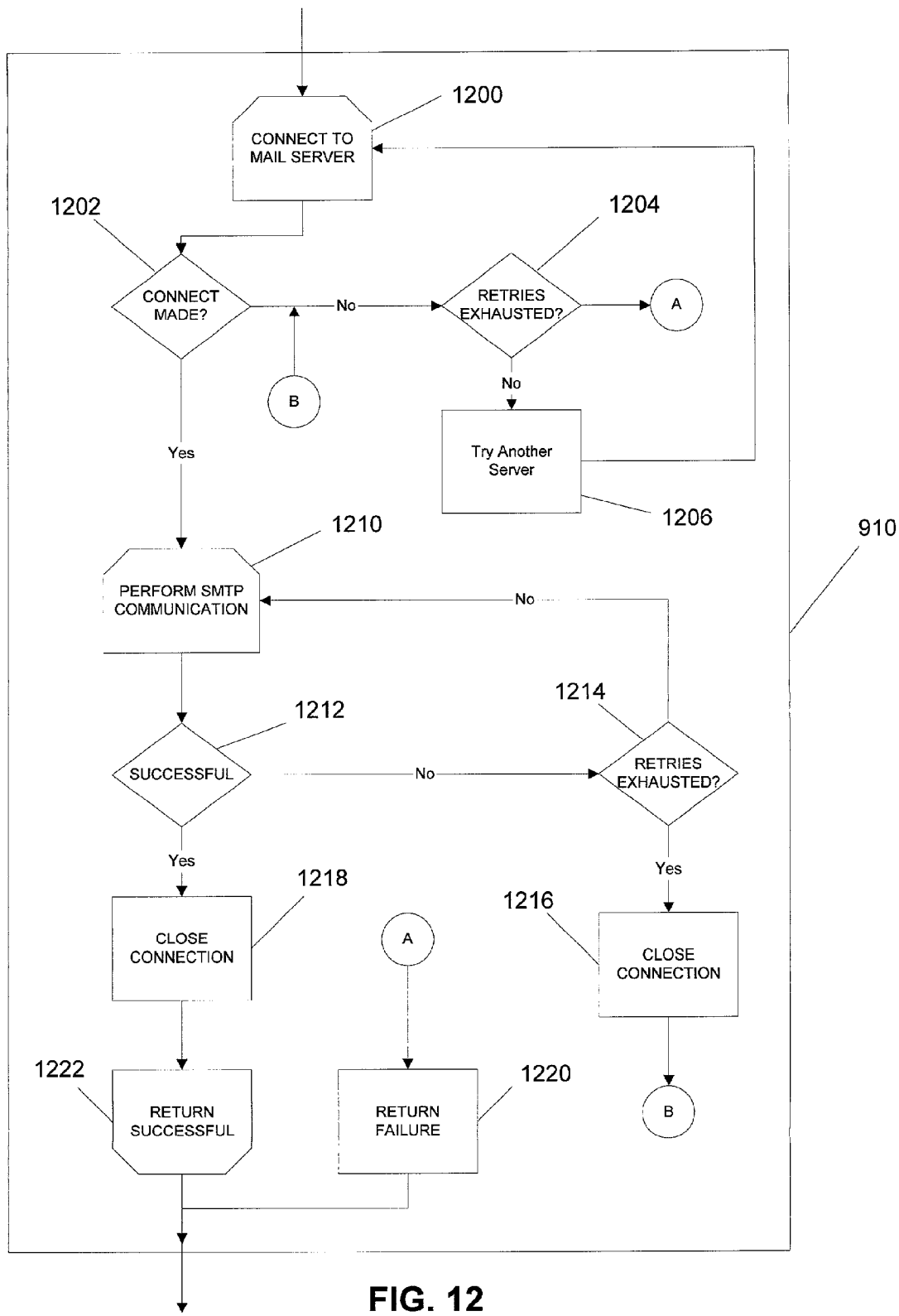
FIG. 12 is a flow diagram illustrating the details of step 910 of FIG. 9 for transmitting the enhanced message with additional tagged information in the header portion initially shown in FIG. 9.

FIG. 12 is a flow diagram illustrating additional details of step 910 of FIG. 9. Step 910 transmits the modified original message with additional tagged information in the header portion used for adding desired rich media content to the original message. Whereas a normal (non-enhanced) e-mail message would be transmitted through mail server processes directly to its originally intended destination, the modified original message is instead transmitted to an external e-mail enhancement server process using standard SMTP protocols. The "to" address of the original message was modified as indicated above in FIG. 11 to reflect an e-mail address associated with the external enhancement server process. Tagged fields in the modified original message indicate the originally intended list of recipients for restoration by the external enhancement server process as discussed below.

In particular, step 1200 connects to an appropriate e-mail server computing device having the external e-mail enhancement server process operable thereon. Step 1202 determines whether the attempt to connect to the selected mail server was successful. If the attempt was not successful, step 1204 determines whether the maximum number of retries for attempting to connect to the mail server has been exhausted. If the maximum number of retries has been exhausted, the process is terminated at step 1220 to return an error status to the calling process. If the maximum retries has not yet been exceeded, step 1206 selects an alternate e-mail server computing device. Processing then continues by looping back to step 1200 to attempt connection to the alternate selected server.

If step 1202 determines that the connection attempted by step 1200 was successful, step 1210 commences SMTP communications with the external e-mail enhancement server with which the connection has been established. Step 1212 determines whether the SMTP communications have been successfully completed. If the SMTP communications have not completed, step 1214 determines whether the maximum number of retries for completing such communication has been exhausted. If the maximum number of retries has not been exhausted, processing continues by looping back to step 1210 to retry the desired SMTP communications for transmitting a modified original message. If it is determined in step 1214 that the maximum number of retries for completing the SMTP communications has been exhausted, step 1216 closes the connection and processing continues with steps 1204 and 1206 as above to select another enhancement server.

If it is determined in step 1212 that SMTP communications have been successfully completed to transmit the modified original message, step 1218 closes the connection made with the e-mail enhancement server and step 1222 returns a successful status to the invoking process thus completing the processing included in step 910.

Those of ordinary skill in the art will readily recognize that the particular looping structures depicted in FIG. 12 to retry failed connections by selecting alternate servers and to retry failed SMTP communications may be implemented in a variety of equivalent manners. The particular number of retries for both operations is a well-known matter of design choice for those of ordinary skill in the art. Further, the number of external e-mail enhancement servers may be any number of servers in accordance with standard design choices known to those of ordinary skill in the art.

E-mail Client Process Add-in

The present invention also provides for a modified e-mail client process. E-mail client processes generally provide a user interface for generating, sending, receiving, and reading e-mail messages. In accordance with the present invention, standard e-mail user interface client programs such as Microsoft Outlook are modifiable to enable the user to apply rich media enhancement template identifiers for e-mail messages generated and transmitted. As noted above, rich media enhancement templates are predefined software code containing formatting instructions and other specifications for rich media content for the delivery of rich media content into the body of an e-mail message when the message is viewed by a recipient. HTML language documents with a placeholder ("a location identifier") for the insertion of a user-generated body of text into the enhanced e-mail message.

Figure 13:
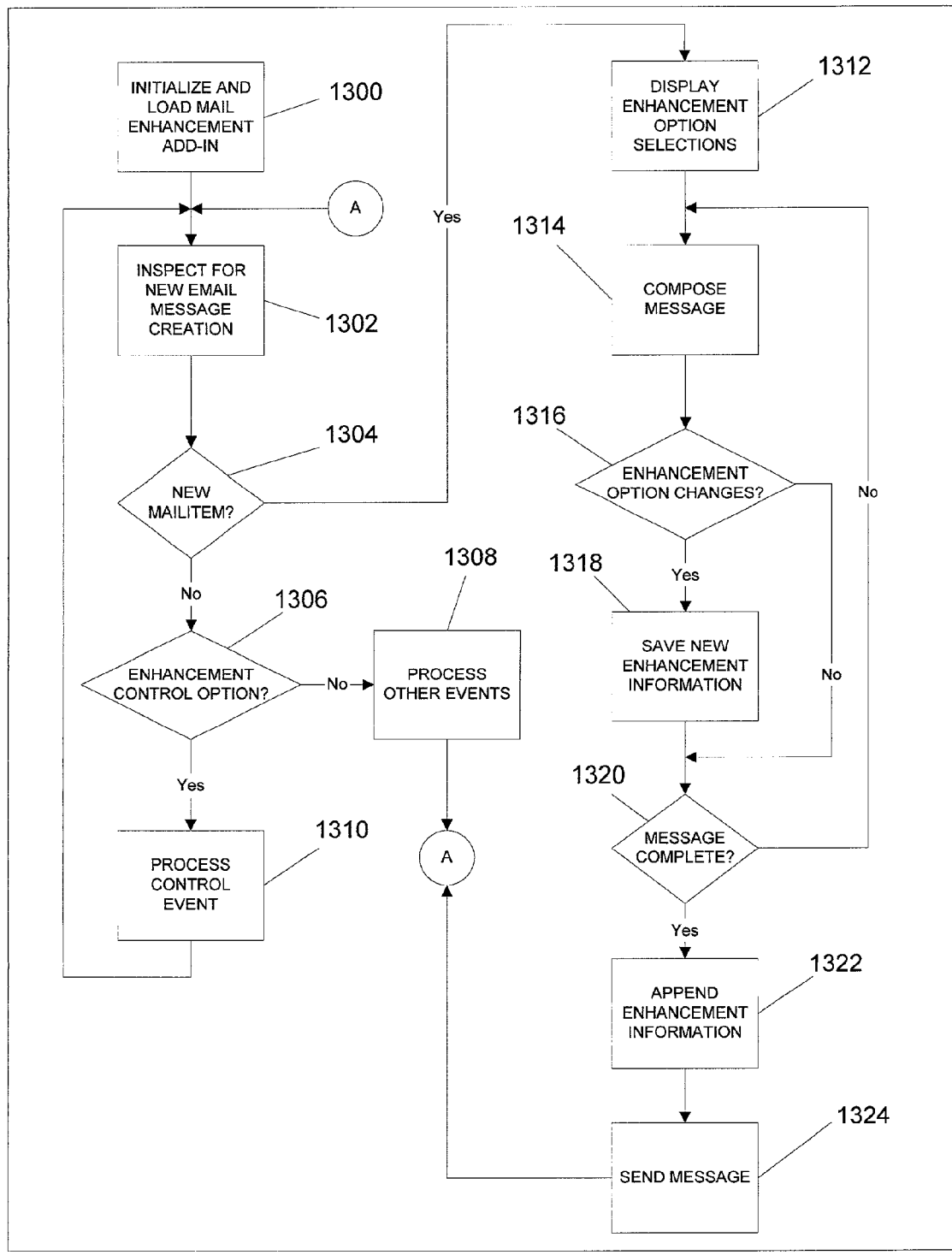
FIG. 13 is a flow diagram illustrating the details of operation of an e-mail client process modified in accordance with the present invention to permit rich media enhancement of user generated e-mail messages.

FIG. 13 is a flow diagram illustrating operation of an e-mail client process modified in accordance with the present invention to permit rich media enhancement of user generated e-mail messages. Specifically, step 1300 initializes and loads the e-mail enhancement add-in features. As is known in the art, many e-mail client processes including Microsoft Outlook provide for standard application program interfaces ("APIs") to permit user-defined enhancements to the basic functionality of the e-mail client process. In particular, Microsoft Outlook includes the capability for such an add-in to intercept and inspect program events normally processed by the Outlook client program. Therefore, step 1300 may be configured to load the e-mail add-in feature of the present invention. Step 1302 inspects Outlook program events monitoring for occurrence of events relevant to the creation of new e-mail messages and the enhancement features of the present invention. Upon interception of such a program event, step 1304 determines whether the intercepted event is a request to create a new e-mail item. If the intercepted event is not a request to create a new e-mail item, step 1306 determines whether the intercepted event relates to a request to change control related options of the e-mail enhancement feature. If the intercepted event is not a request to change control related options of the e-mail enhancement feature, step 1308 processes other intercepted events typically by permitting standard Outlook processing to proceed on such an event. Processing then continues by looping back to step 1302 to await interception of another Outlook program event.

If it is determined in step 1306 that the intercepted event is a request to change control options of the e-mail enhancement feature, step 1310 processes the intercepted enhancement control related event and then continues processing by looping back to step 1302 to await the interception of another Outlook event.

If it is determined in step 1304 that the intercepted event mandates or requests the creation of a new e-mail message (often referred to as an "item"), step 1312 then displays the present options available to the user for e-mail enhancement features. Steps 1314 through 1320 then permit the user to compose an e-mail message (compose the body of text of the e-mail message) and to modify current option selections for the e-mail enhancement feature. Specifically, step 1314 allows the user to compose the body of text of the new e-mail message. Steps 1316 and 1318 determine during the message composition whether the user has requested a change to the e-mail enhancement options selections. If the user has made such a request, step 1318 saves the new enhancement related option information. Step 1320 determines whether the user has completed the composition process by, for example, clicking of the "send" button or equivalent menu selections to request transmission of the completed message. If the message composition process is not yet complete processing continues looping back through steps 1314 and 1320 until the composition process has been completed and any desired option changes are completed.

When the message composition process is completed and the user has configured e-mail enhancement options as desired, step 1322 appends all necessary enhancement information to the message. In particular, the e-mail enhancement information includes an identifier of the user-selected template, if any, for rich media enhancement of the e-mail message. Other option settings relating to the e-mail enhancement feature may also be imbedded within the message prior to transmission for use by the local and external e-mail enhancement server processes as discussed further herein. Lastly, step 1324 transmits the message to the e-mail server as discussed elsewhere herein. Following transmission of the message to the e-mail server, processing in the client continues by looping back to step 1302 to await the interception of further e-mail client program events.

Figure 14:
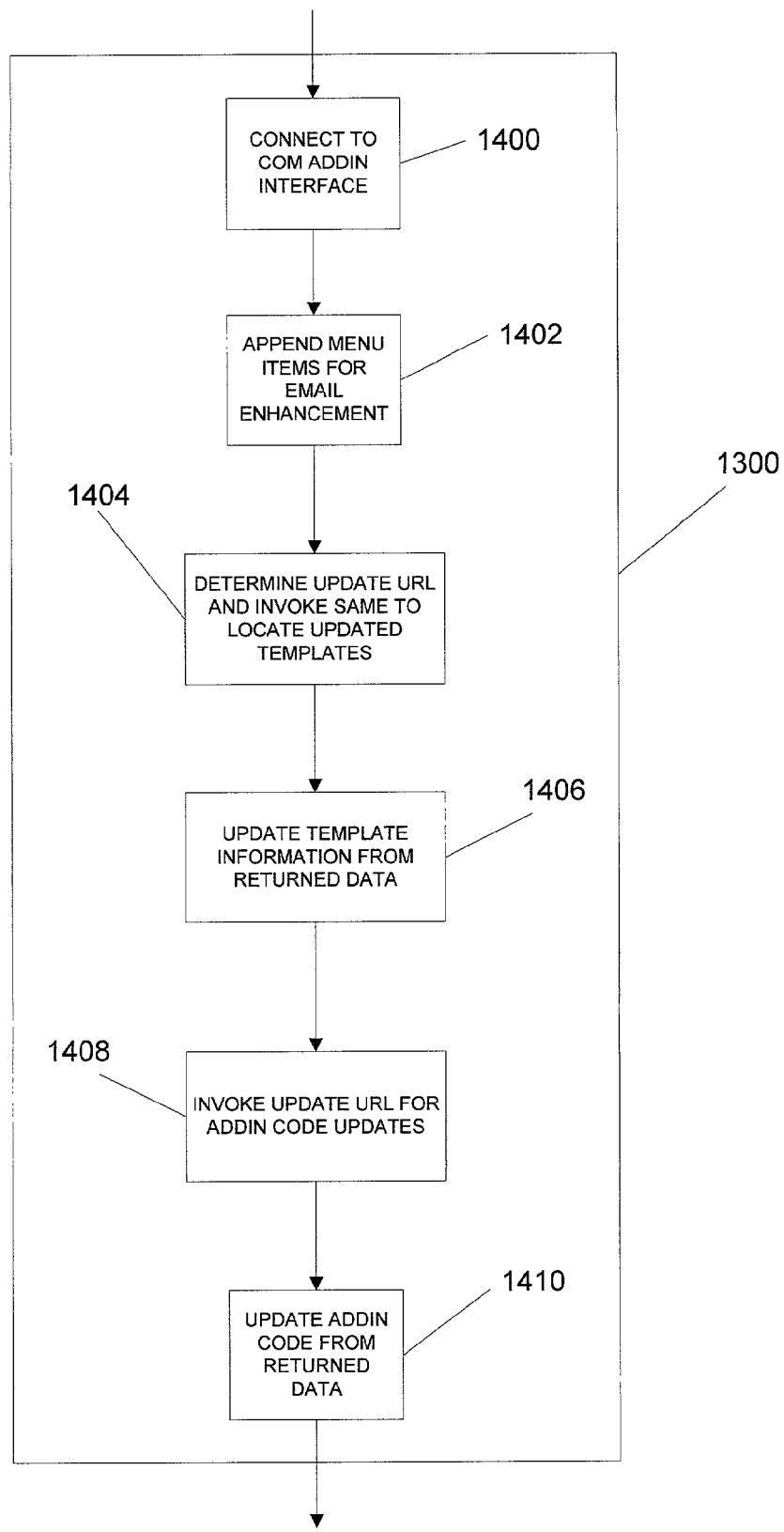
FIG. 14 is a flow diagram illustrating the details of step 1300 of FIG. 13 for initializing and loading the e-mail enhancement add-in initially shown in FIG. 13.

FIG. 14 is a flow diagram providing additional details of step 1300 of FIG. 13. As noted above, step 1300 initializes the e-mail client process, which includes, but is not limited to, loading the add-in code in accordance with operation of the e-mail client process of the present invention. Further as noted above, the add-in (also frequently referred to as a "plug-in") is described as operational in the context of the Microsoft Outlook e-mail client program. Those of ordinary skill in the art will readily recognize a variety of other e-mail client programs with similar features to permit add-in code to customize aspects of user interface.

Step 1400 connects to the Microsoft Outlook standard "COM" interface of the e-mail client program. Again as noted above, those of ordinary skill in the art will readily recognize that the Microsoft COM API is particularly relevant to the Microsoft Outlook e-mail client program. Other e-mail client programs may offer similar object oriented API elements to permit add-in or plug-in additions to the functionality and interface of the client program. Step 1402 then appends menu items to existing Outlook menus and/or adds entire menus specific to the functionality of the present invention for e-mail message rich media enhancement. Step 1404 then determines a desired server location for verifying status of rich media templates and software code related to the enhanced features of the present invention, as well as a list of available templates. In one instance, the server location can be identified by a URL recorded, for example, in a registry database entry of a Microsoft Windows operating system. As above, those of ordinary skill in the art will recognize numerous equivalent techniques for recording and retrieving such information regarding initialization of the rich media enhanced features of the present invention.

Step 1404 also contacts the recorded URL to obtain information regarding present provisions and other information of rich media templates defined for use in accordance with a present invention. Having located such information, step 1406 then updates the list of available templates from the data returned by the predetermined URL server. Steps 1408 and 1410 request revision and update information from the predetermined URL server relating to the add-in code segments. In one example, the URL server of record also maintains the most recent version of add-in (plug-in) code elements used to implement the enhanced rich media features of the present invention. In particular, step 1408 requests information regarding current revisions of add-in code elements and step 1410 updates the add-in code elements from the data returned in response to the request in step 1408.

Those of ordinary skill in the art will readily recognize a variety of other types of initializations to be performed on behalf of the enhanced features of the present invention, thereby falling within the scope therein. In particular, other equivalent techniques for identifying current available rich media templates as well as present revisions of add-in enhancement code will be readily apparent to those of ordinary skill the art. Such design choices are well-known to those of ordinary skill in the art of object oriented programming and, in particular, add-in and or plug-in module coding.

Figure 15:
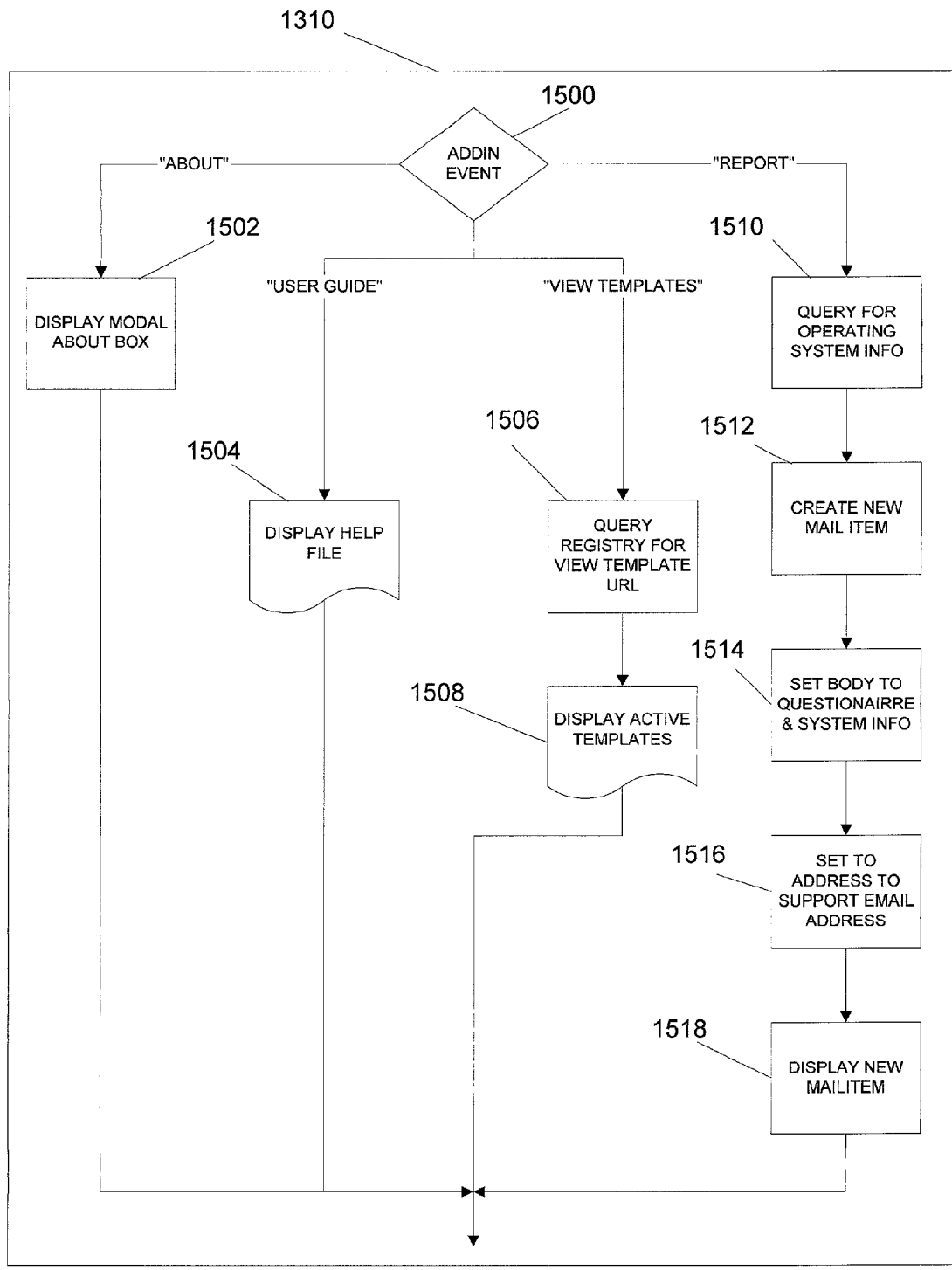
FIG. 15 is a flow diagram illustrating the details of step 1310 of FIG. 13 for processing the intercepted enhancement control related event initially shown in FIG. 13.

FIG. 15 is a flow diagram providing additional details of step 1310 of FIG. 13 in which control related events pertaining to configuration and management of the e-mail enhancement feature of the present invention are processed. As noted above with regard to FIG. 13, the add-in code features of the present invention are operable within an e-mail client in accordance with standard object oriented add-in and plug-in API specifications of the particular e-mail client program. As further noted above, the present invention is presented herein in the context of a plug-in or add-in to the Microsoft Outlook e-mail client program. Those of ordinary skill in the art will recognize that any number of e-mail client programs may be used in conjunction with an add-in or plug-in element to enhance the features of the e-mail client in accordance with the present invention.

Integration of the present invention with existing e-mail client programs can include incorporation of online help and user guide features as well as substantive features to manage and control the rich media e-mail enhancement aspect of the present invention.

Step 1500 first determines the type of enhanced e-mail control event detected as discussed above with regard to FIG. 13. If an event requesting information "about" the add-in code feature is detected in step 1500, then step 1502 displays "about" information. Typically such an "about" information box includes information such as revision number, release date and other control information about the add-in code feature. Processing of step 1310 is thereby completed.

If a "user guide" control event is detected in step 1500, then step 1504 presents the user with online help and user guide information to assist the user in utilizing the rich media e-mail enhancement features of the add-in code modules. Processing of step 1310 is thereby completed.

If a request to view available rich media templates is detected in step 1500, steps 1506 and 1508 then process the request. Specifically, step 1506 queries the registry database for URL information identifying a server responsible for presenting current information about available rich media templates. Step 1508 then presents the returned information permitting the user to view presently available ("active") templates. Processing of step 1310 is thereby completed.

If a "report" event is detected in step 1500, steps 1510 through 1518 generate a trouble report e-mail item for transmission to the support organization responsible for the rich media enhancement add-in code feature. Specifically, step 1510 obtains configuration information from the system on which the e-mail client is operating. Step 1512 creates a new e-mail message item in accordance with standard API techniques of the e-mail client program. Step 1514 sets the text body of the new e-mail message item to a questionnaire form with system information preloaded into various answers of the questionnaire. Step 1516 forces the "to" e-mail address to the e-mail address of the support organization responsible for maintaining the rich media e-mail enhancement add-in code features. Step 1518 then displays the newly generated e-mail message item to the user for completion and transmission to the support organization. Processing of step 1310 is thereby completed.

Those of ordinary skill in the art will readily recognize a variety of other control features and configuration options and that may be processed in accordance with the architecture shown FIG. 15. The flow diagram of FIG. 15 is therefore intended merely as representative, rather limiting, of typical control and configuration options useful in accordance with the rich media e-mail enhancement features of the present invention.

Figure 16:
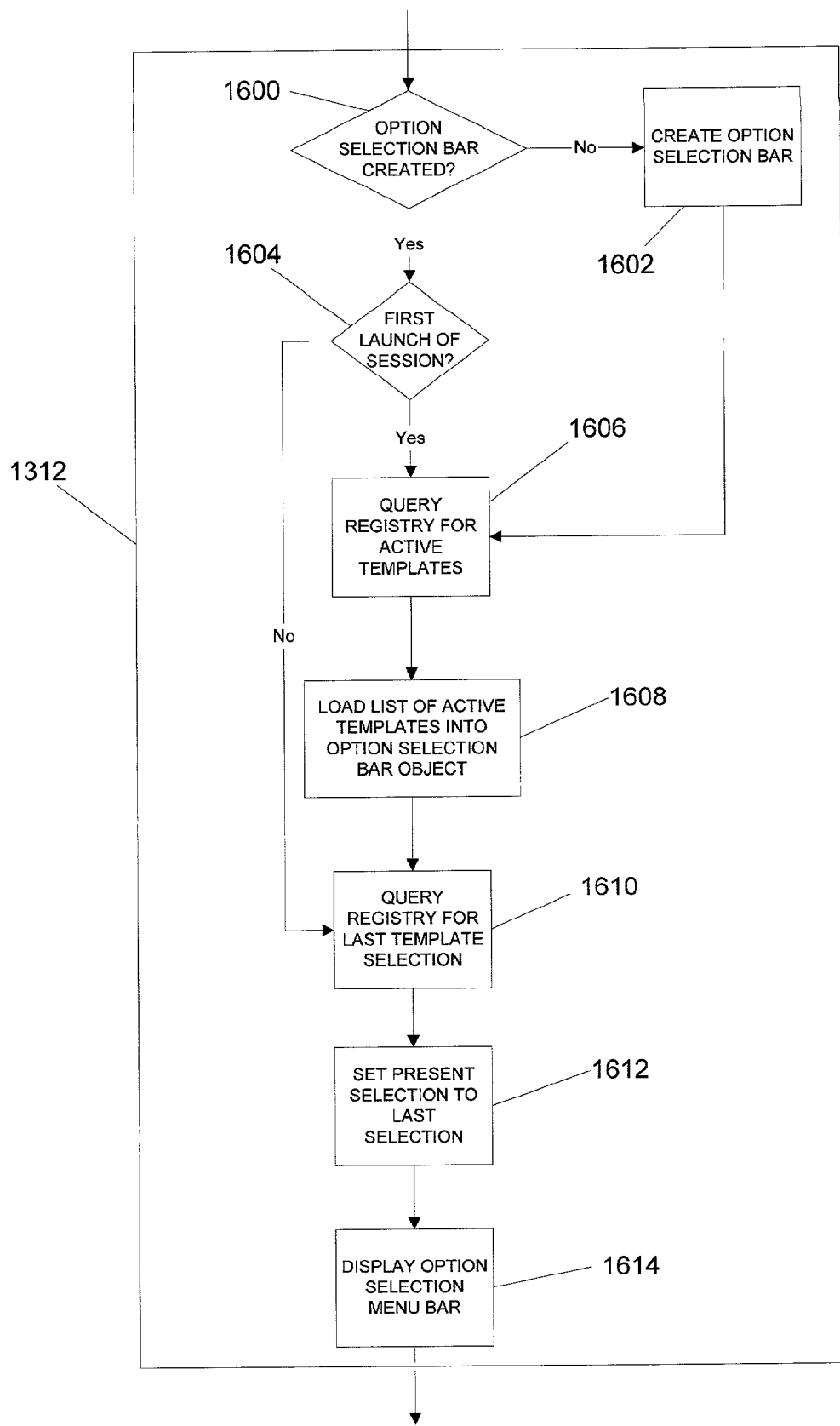
FIG. 16 is a flow diagram illustrating the details of step 1312 of FIG. 13 for displaying the present options available to the user for e-mail enhancement features initially shown in FIG. 13.

FIG. 16 is a flow diagram providing additional details of step 1312 of FIG. 13. Step 1312 presents a "menu bar" used for selection of a particular active template by the user of the e-mail client program. Step 1600 first determines whether the option selection menu bar object has been previously created. If the option selection menu bar object has not been created previously, processing continues with step 1602 to create an options selection menu bar. Processing then continues to step 1606 as described immediately herein below.

If it is determined in step 1600 that the option menu bar has been previously created, step 1604 next determines whether the present invocation of the e-mail client program is the first "launch" of the session requiring use of the rich media e-mail enhancement features and the corresponding options selection menu bar. If this is the first such invocation of the e-mail client program, steps 1606 and 1608 query the system registry database determine the presently active rich media templates and to load the list of such active templates into the options selection menu bar object previously created. With the menu bar object so created and loaded, step 1610 queries the system registry database to determine the last template selected by the user. Step 1612 then highlights that previously selected template as the present selection in the options selection menu bar. Lastly, step 1614 displays the options selection menu bar as created and configured in steps 1600 through 1612.

Those of ordinary skill in the art will readily recognize a variety of equivalent programming techniques for generation and presentation of such graphical user interface objects in accordance with the API of the e-mail client program and the API of the underlying operating system. FIG. 16 is therefore intended merely as representative of one typical programming technique, rather than limiting, for generation and presentation of such an options selection menu bar.

Figure 17:
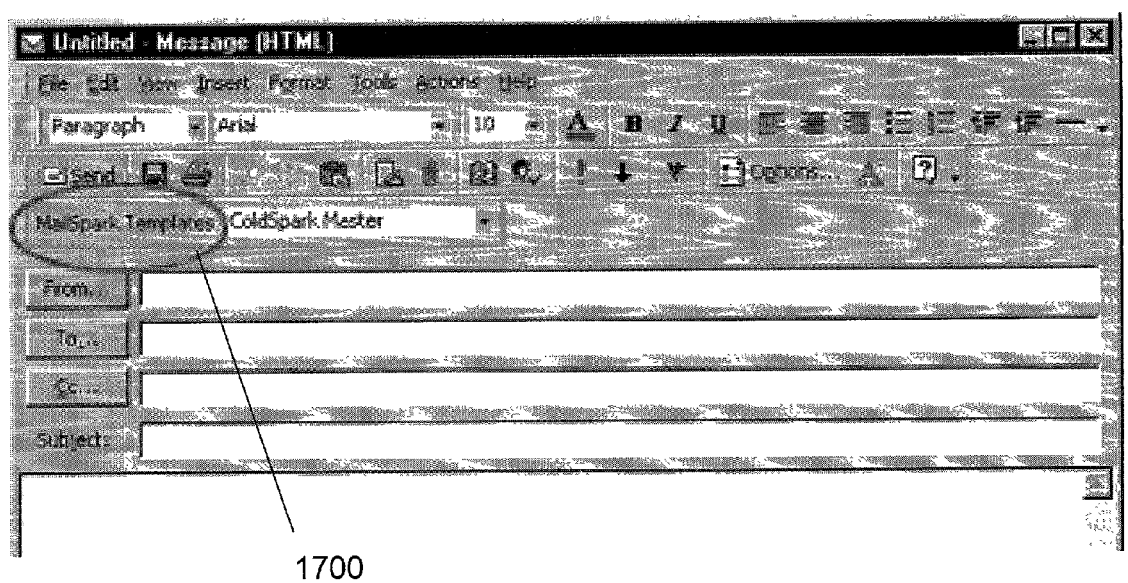
FIG. 17 is an exemplary screen image of a new mail item window generated by Microsoft Outlook e-mail client program as enhanced to include an options selection menu bar in accordance with the present invention.
Figure 18:
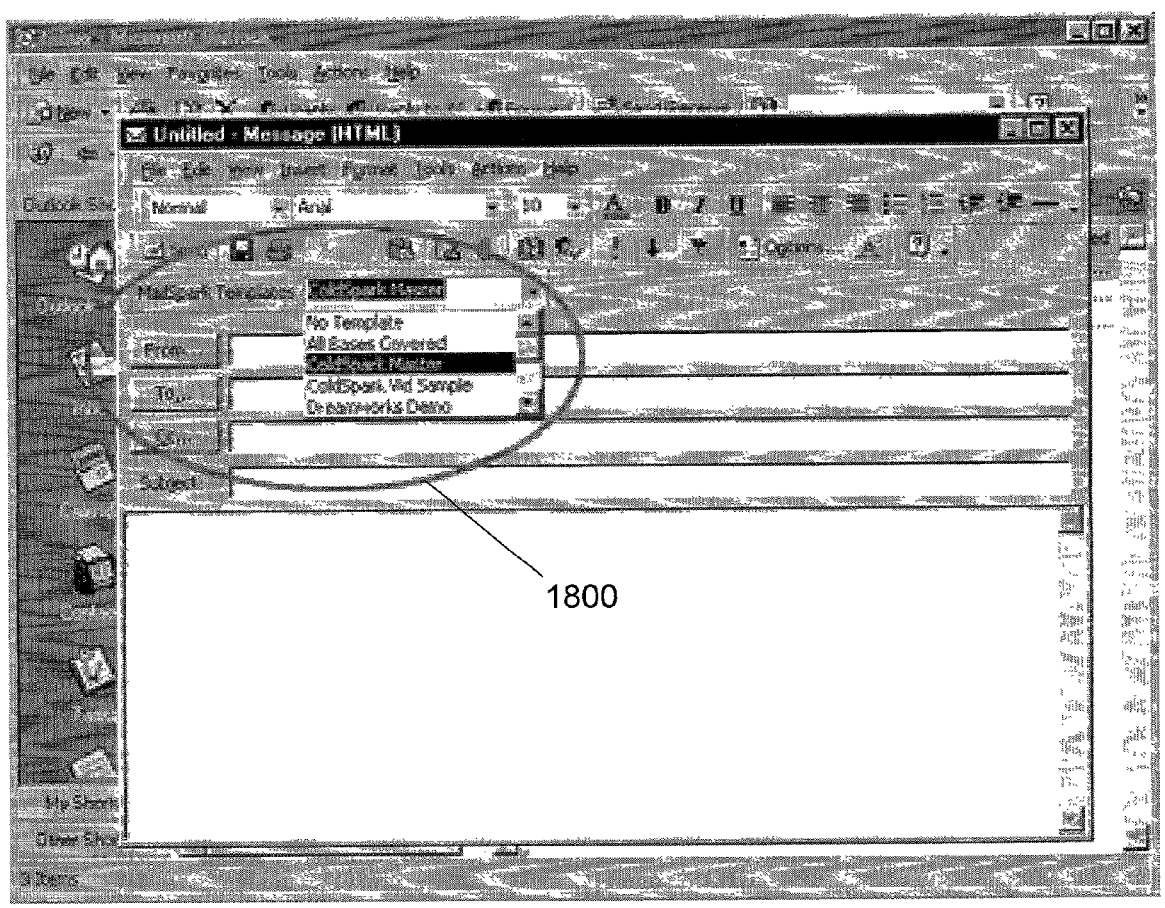
FIG. 18 is an exemplary screen image of a menu bar 1700 as shown in FIG. 17 after the user clicks on a templates list to display the list of available active templates.

FIG. 17 is an exemplary screen image of a new mail item window generated by the Microsoft Outlook e-mail client program as enhanced to include an options selection menu bar 1700 as discussed above. FIG. 18 shows menu bar 1700 after the user clicks on the templates list to display the list of available active templates 1800.

Figure 19:
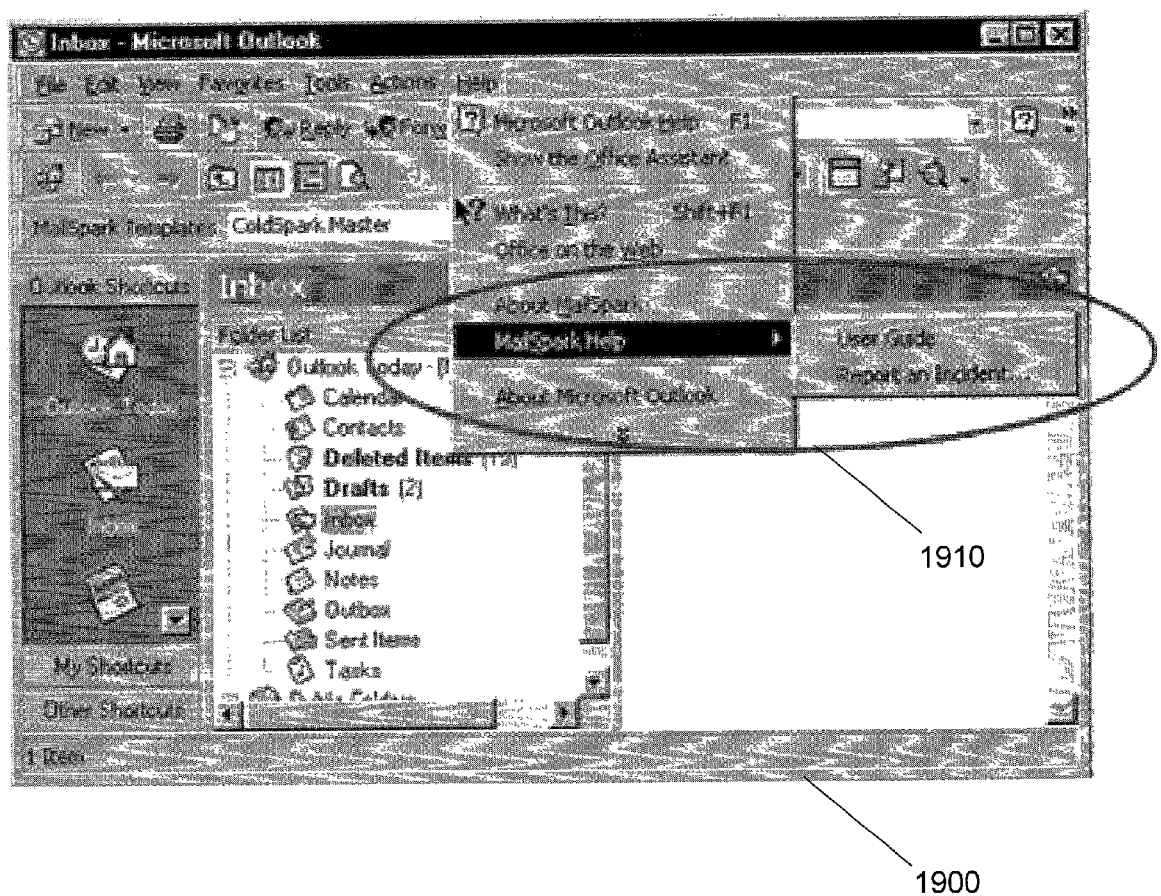
FIG. 19 is an exemplary screen image of an enhanced help screen added into the Microsoft Outlook program reflective of help features available for the rich media e-mail enhancement features in accordance with the present invention.
Figure 20:
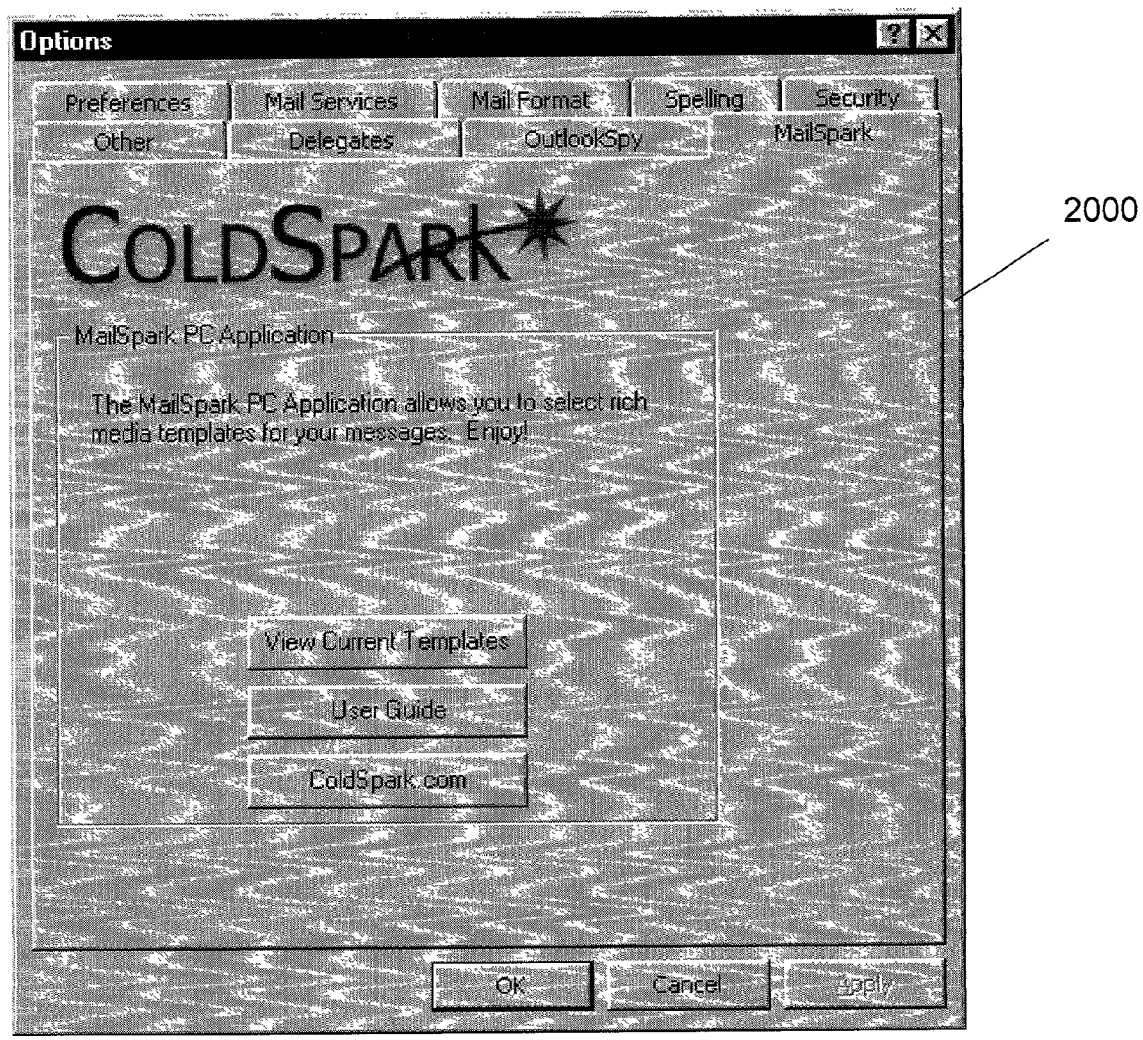
FIG. 20 is a typical screen shot of an options page added to the standard options pages of Microsoft Outlook for enabling the user to review currently available templates and other helpful information in accordance with the present invention.

FIG. 19 is an exemplary screen image of an enhanced help screen added into the Microsoft Outlook program reflective of help features available for the rich media e-mail enhancement features of the present invention. FIG. 20 shows a typical screen shot of an options page added to the standard options pages of Microsoft Outlook for enabling the user to review currently available templates and other helpful information.

Those of ordinary skill in the art will readily recognize that FIGS. 17, 18, 19 and 20 are intended merely as exemplary screen images for adding the enhancement features of the present invention into a particular e-mail client program, namely Microsoft Outlook. Accordingly, any number of modifications may be made while still remaining within the scope of the present invention. As noted above, a variety of other e-mail client programs and user interface techniques may be chosen by those of ordinary skill in the art to create similar enhancements for adding rich media to outbound e-mail messages.

Rich Media E-Mail Enhancement Server Process

The present invention also provides for a rich media e-mail enhancement server process. As noted above, an enhanced client process generates e-mail messages and forwards them first to the local e-mail enhancement server. The local e-mail enhancement server process reformats the original message to save certain information and to add tagged information used by the rich media e-mail enhancement server process to complete the rich media enhancement and forward the message to the originally intended recipient. Further as noted above, in this embodiment, the local e-mail enhancement server does not actually add the desired rich media template. This property reduces the volume of data transmitted from the e-mail client process by deferring the work of enhancing the e-mail message with rich media content and transmitting the more voluminous enhanced message to an external enhancement server.

Still further as noted above, an alternate embodiment of the present invention integrates the enhancement features within a single e-mail server process rather than dividing the processing between a local server process and an external server process. An architecture wherein the enhancement processing is divided between two such server processes is desirable where the enhancement services are offered by a service provider for a plurality of clients via the Internet.

Figure 21:
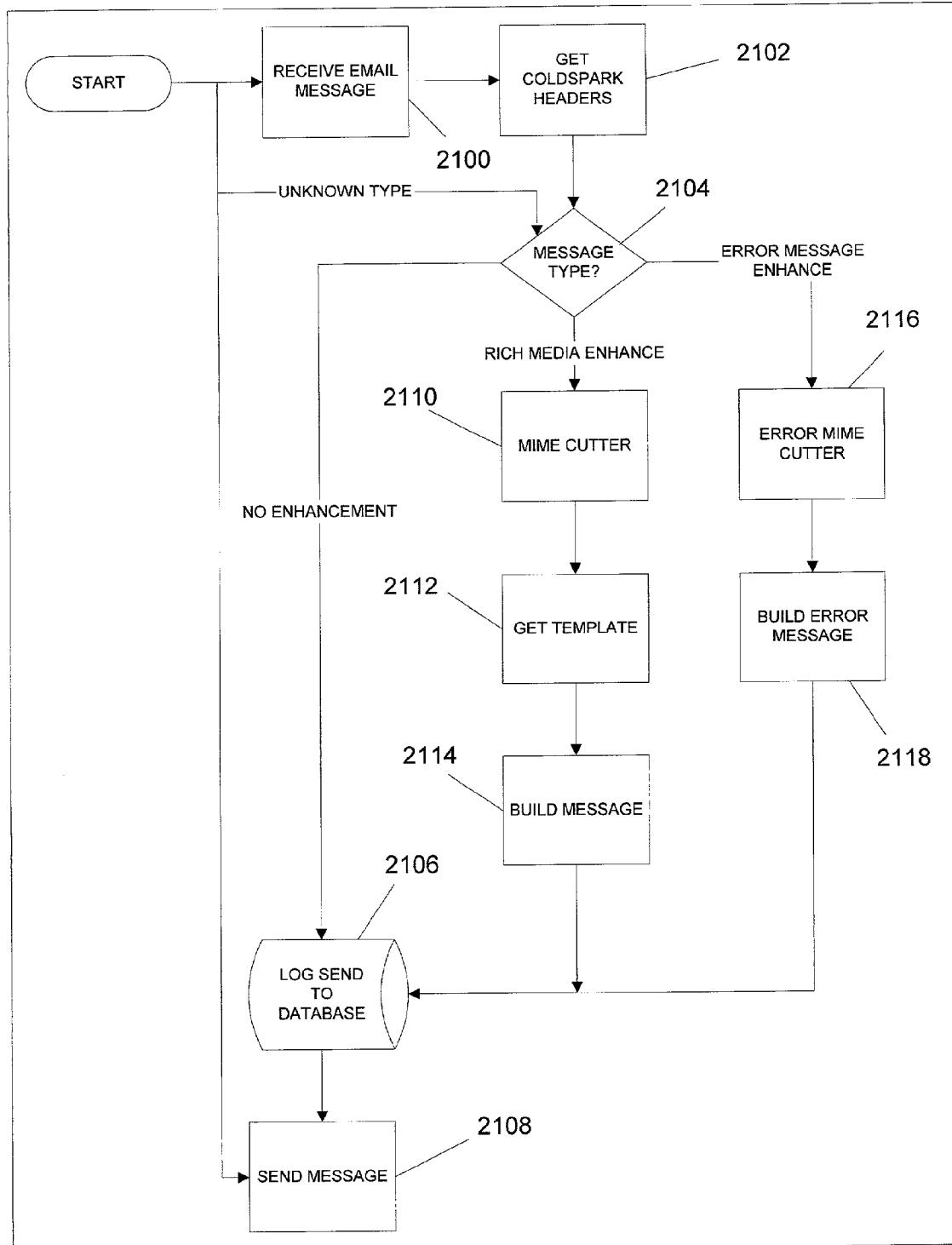
FIG. 21 is a flow diagram illustrating one method for implementation of the processing application in the e-mail messaging system for enhanced rich media delivery in accordance with the present invention.

FIG. 21 is a flow diagram illustrating one method for the second process (see, for example, item 330 in FIG. 4) of a rich media e-mail enhancement server in accordance with the present invention. Step 2100 awaits receipt of a tagged e-mail message from the first process of the e-mail enhancement server as discussed above. The tagged e-mail message has been modified by the local e-mail enhancement server to save original header information, to add new header information and to add any locally specified additional tagged information useful by the rich media e-mail enhancement server for adding the desired rich media content.

Step 2102 then extracts header information identifying the originating network and locally generated specifications for the type of rich media enhancement desired. Step 2104 processes the received e-mail message in accordance with locally generated (by the e-mail client "add-in" or local enhancement server) specifications for the type of rich media enhancement desired. Where an unknown type of enhancement is requested as determined in step 2104, the message can, for example, be ignored and processing continues by looping back to step 2100 to await receipt of a next, tagged, e-mail message.

If it is determined in step 2104 that no enhancement was specified, then step 2106 logs the message to be transmitted in a local log database. Step 2108 sends the message devoid of rich media enhancement to the originally intended recipient. Processing then continues by looping back to step 2100 to await receipt of a next tagged, e-mail message.

If it is determined in step 2104 that a user-originated e-mail message that has been specified for rich media enhancement has been received, then steps 2110 through 2114 generate the new rich media enhanced message. Specifically, step 2110 parses the MIME content of the tagged original message to extract various attributes therefrom. Following the parsing step 2110, step 2112 retrieves the identified template. The template desired for this message's rich media enhancement is provided by one of the tagged entries located and extracted by operation of step 2110 above. The selected template is retrieved from the database associated with this e-mail enhancement server. Step 2114 then builds the desired rich media enhanced e-mail message using the template information obtained in step 2112 and the variables and attributes extracted from the received tagged e-mail message in step 2110. The newly constructed rich media enhanced e-mail message built in step 2114 is then logged in the database in step 2106 and sent to the originally intended recipient in step 2108. Processing then continues by looping back to step 2100 to await receipt of a next tagged e-mail message.

If it is determined in step 2104 that an error e-mail message has been received, steps 2116 and 2118 then generate an enhanced rich media e-mail message corresponding to the received error message. Error e-mail messages are often generated by e-mail related daemon programs. Specifically step 2116 operates in a manner analogous to aforedescribed step 2110 to parse the received e-mail message to extract various attributes from the header and tagged information. Using these extracted attributes and variables, step 2118 operates in a manner analogous to aforedescribed step 2114 to build an enhanced rich media message corresponding to the originally received error message. Step 2106 then logs the generation and transmission of the enhanced rich media error e-mail message in the server's database and step 2108 then transmits the enhanced rich media error e-mail message to the original sender of the message. Processing then continues by looping back to step 2100 to await receipt of a next e-mail message.

Figure 22:
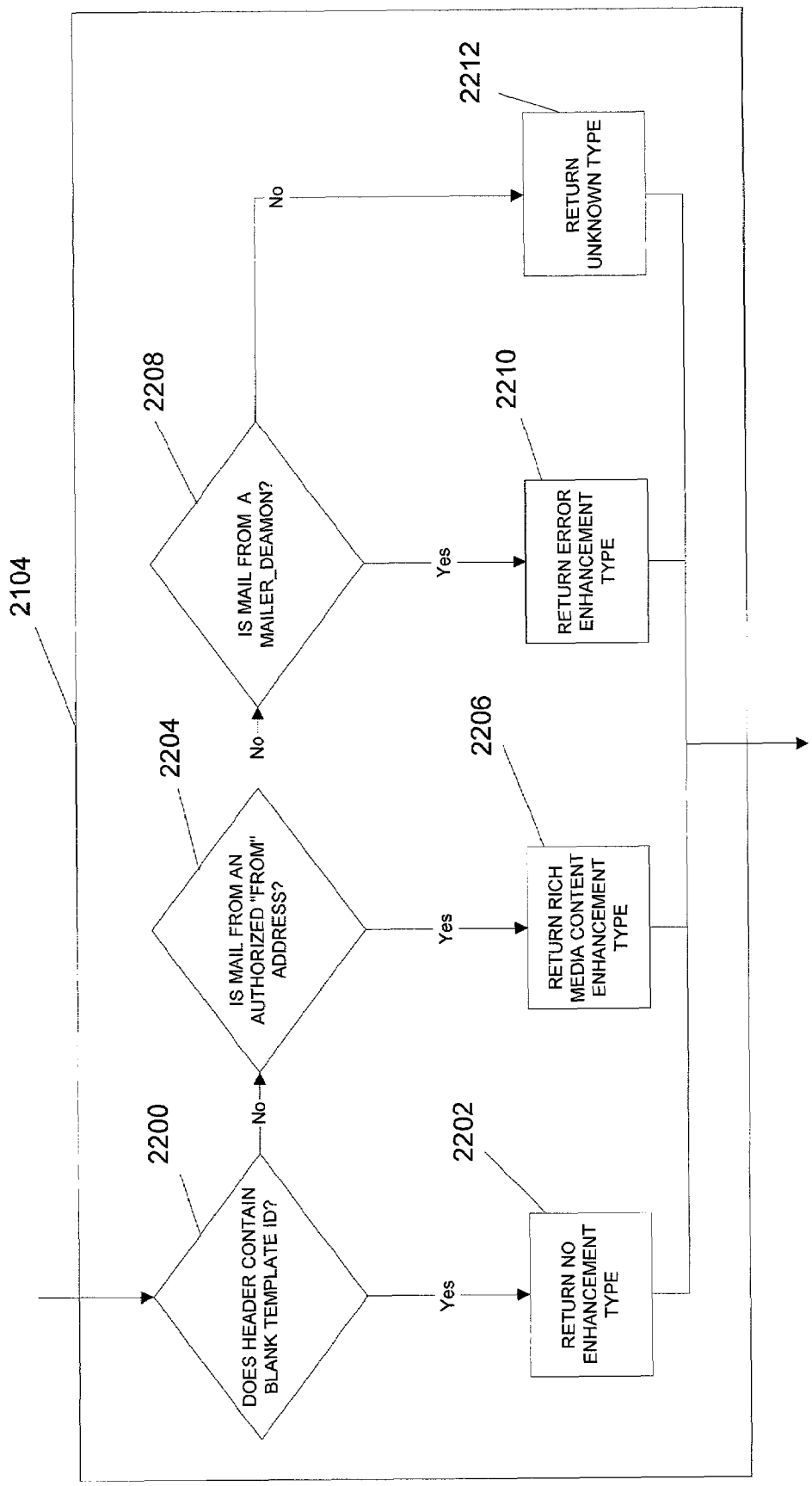
FIG. 22 is a flow diagram illustrating the details of step 2104 of FIG. 21 for determining the e-mail message type initially shown in FIG. 21.

FIG. 22 is a flow diagram providing additional details of step 2104 described above with respect to FIG. 21. In particular, step 2200 first determines if the received message indicates that no rich media enhancement is desired. In one example, the ID tag of the selected rich media template can be extracted from the tagged information in the received message and indicates the type of enhancement desired for the message. If the ID signifies that no template is to be used in this case, step 2202 returns the status indicative of no rich media enhancement for the received e-mail message.

If some ID tag is found in the message, step 2204 determines if the message is received from an authorized "from" address. In one example, as noted above, the "from" address in the modified, tagged e-mail message indicates that the sender of the message is the local e-mail server associated with the user's e-mail address and any e-mail client "plug-in" inserted template tag information. For instance, the modified "from" address indicates a unique identifier associated only with a legitimate local e-mail server operable in accordance with the present invention. If it is determined in step 2204 that the message is from an appropriate sender address, step 2206 returns the status indicative of the need for rich media enhancement in accordance with the identified rich media template.

If it is determined in step 2204 that the message is not from an appropriate sender address, step 2208 determines whether the received message is from an appropriate mailer daemon program. As is commonly known in the art, mailer daemon programs are processes operable within the networking infrastructure of most common operating systems that manage the transmission of e-mail messages between systems. Where networking or other errors are encountered, the daemon programs generate an e-mail message returned to the sender of the message that generated the error. If it is determined in step 2208 that the received message is from such a daemon program, step 2210 returns a status indicative of the receipt of an error message from a mailer daemon program. Rich media enhancement of such error message is performed in accordance with a predetermined error message rich media template. If the type cannot be identified in steps 2200, 2204 and 2208, a status indicative of an unknown type of received e-mail message is returned in step 2212.

Figure 23:
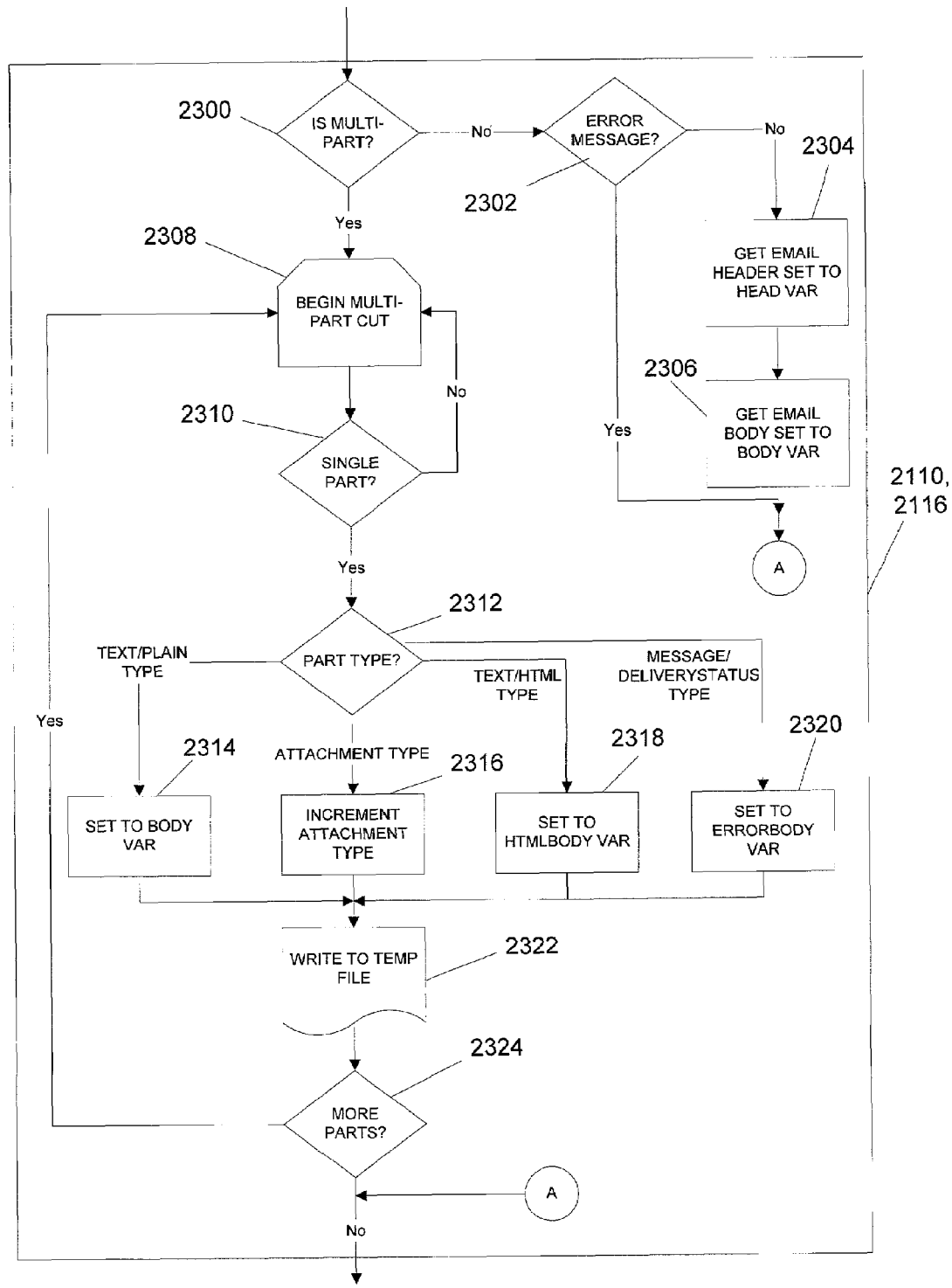
FIG. 23 is a flow diagram illustrating the details of steps 2110 and 2116 of FIG. 21 for parsing the received e-mail message to extract useful information from the header and to parse the MIME components of the received message into appropriate variables for construction of a new, enhanced, rich media e-mail message initially shown in FIG. 21.

FIG. 23 is a flow diagram illustrating steps 2110 and 2116 in additional detail. Steps 2110 and 2116 parse t received e-mail message to extract useful information from the header and to parse the MIME components of the received message into appropriate variables for construction of a new, enhanced, rich media e-mail message. Specifically, step 2300 first determines whether the received e-mail message uses the multipart MIME encoding format. If the received e-mail message does not use the multipart MIME encoding format, step 2302 is next operable to determine whether the received message is an error message generated by a mailer daemon program. If the received message is an error message generated by a mailer daemon program, processing is complete and the message is not further parsed or modified. If the received message is not an error message generated by a mailer daemon program, step 2304 then extracts the header information from the received message and save the extracted information in a variable, such as "HEAD", for later use in building an enhanced, rich media version of the error message. Step 2306 saves the e-mail body (i.e., the body of text representing the error message) into a variable, such as "BODY", for later use.

If it is determined in step 2300 that the received tagged message uses the multipart MIME format, then step 2308 begins the multipart parsing or cutting operation. For example, steps 2308 through 2324 can be repeated in a recursive manner to parse the complex structure provided for by the MIME specification. Step 2310 first tests whether the MIME component presently being evaluated by the current recursive invocation of the multipart MIME parsing is a single part or multipart. If the present component is a multipart component, processing continues by recursively following steps 2308 through 2324 to parse the multipart component encountered. If the present component evaluated in step 2310 is a single part component, no further multipart breakdown is necessary for this component and processing continues with step 2312.

Step 2312 determines the MIME type of the present component. If the present component is of MIME type "text/plain", step 2314 saves the component in the BODY variable of the present message. If it is determined in step 2312 that the present component is an "attachment" MIME type, step 2316 increments a counter indicative of the number of such attachment components for later inclusion in the rich media enhanced version of the e-mail message. If it is determined in step 2312 that the present component is of MIME type "text/HTML", step 2318 saves the text type component in a variable such as HTMLBODY. If it is determined in step 2312 that the present component is a MIME type "message/deliverystatus", step 2320 saves the present component in another variable such as ERRORBODY. In all four cases, (steps 2314, 2316, 2318 and 2320) processing continues with step 2322 to write the detected component in a temporary file for later retrieval in building the content rich enhanced e-mail message.

Lastly, step 2324 determines if there are more parts in the multipart MIME message format yet to be processed. If there are more parts to be processed, processing continues by looping back to step 2308 to process the next multipart MIME component within the present recursive invocation of the method. If no further parts remains to be processed, the method exits (returning to a previous recursion level as necessary until all recursive invocations of the method have completed).

Those of ordinary skill in the art will recognize a variety of equivalent techniques for breaking apart a multipart MIME formatted message into its constituent elements. The recursive technique presented in FIG. 23 is therefore intended merely as exemplary of one such design choice readily recognized by those of ordinary skill in the art.

Figure 24:
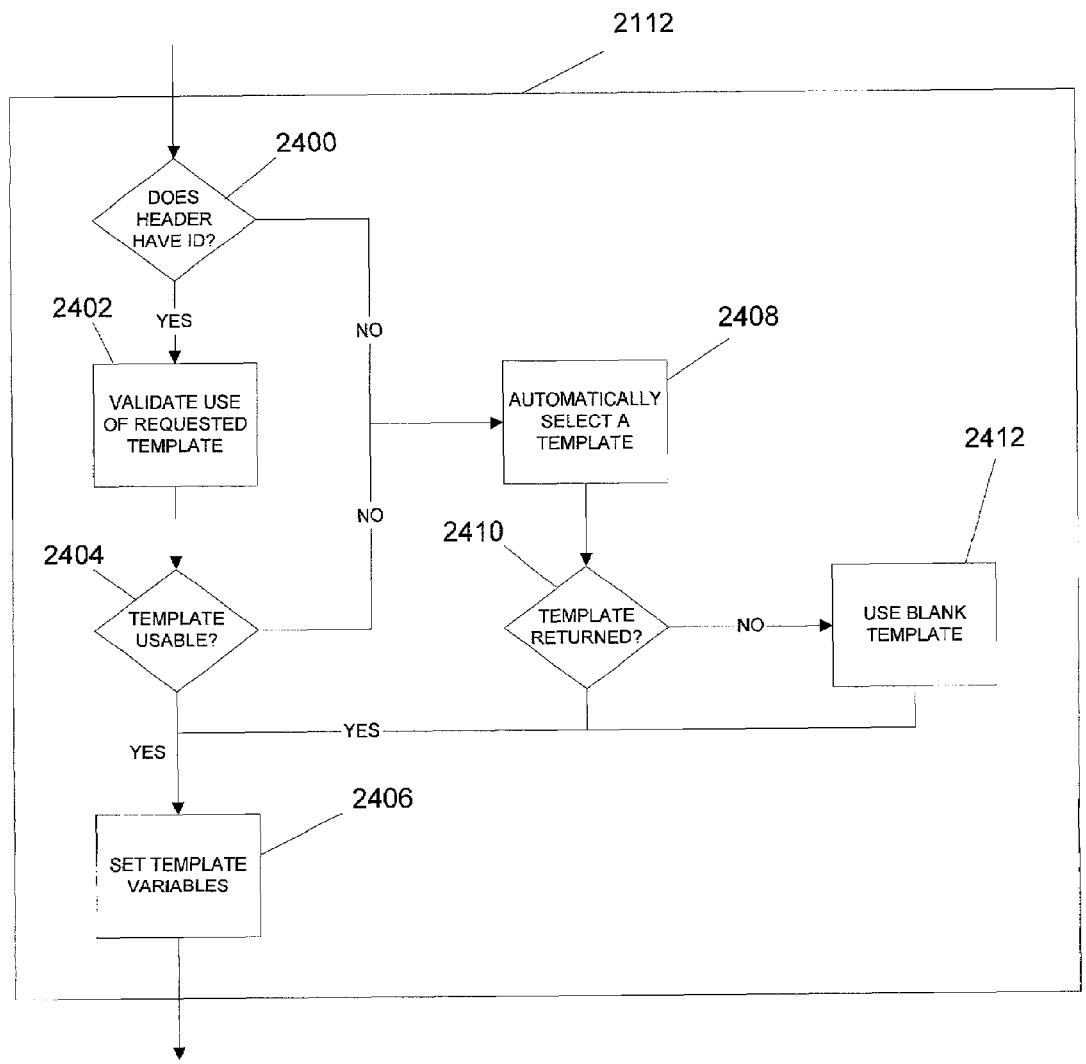
FIG. 24 is a flow diagram illustrating the details of step 2112 of FIG. 21 for retrieving an appropriate rich media template for use in generating a rich media enhanced version of the original e-mail message initially shown in FIG. 21.

FIG. 24 is a flow diagram illustrating additional details of step 2112 of FIG. 21. As described above, step 2112 retrieves an appropriate rich media template for use in generating a rich media enhanced version of an original e-mail message. It is understood that a template may be selected in accordance with any of several techniques including explicit selection by the e-mail client program user, selection in accordance with the originator or the intended recipient, automated cyclic methods for rotating selection among a plurality of templates (as discussed further herein below), and other techniques recognized by those of ordinary skill in the art. Regardless of the method for template selection, step 2112 attempts to retrieve the selected template for further processing by the method as illustrated in FIG. 21.

Specifically, step 2400 determines whether the header of the original message includes an ID tag indicating a particular selection, or selection criteria, for a rich media template. An explicit selection of a template or an ID tag indicating locally specified template selection criteria may be provided by the e-mail client program user or added by the local enhancement server. This selection is indicated in variables in the header of the modified original message. If an ID tag is included in the header, step 2402 validates the use of the selected template according to a predetermined template selection criteria. This validation step includes, for example, querying of the database associated with the e-mail enhancement server to locate the specified template. Step 2404 then determines whether the sender of the message is authorized to access the specified template. If the message sender is so authorized, step 2406 utilizes the template as retrieved from the server's database to set appropriate variables within the method for later use in constructing the enhanced rich media e-mail message.

If either step 2400 fails to locate an ID in the original e-mail message header or if step 2404 fails to validate the used of a specified template, step 2408, for example, can automatically selects a template for use in enhancing the original message. Step 2410 then determines whether the automated selection processing succeeded in locating an appropriate template. For instance, step 2410 can determine whether the returned template still exists and is accessible by the system. If the returned template does exist and is accessible, the processing continues with step 2406 as described above to utilize information in the automatically selected template. If it is determined in step 2410 that an appropriate template is not successfully located during step 2408, step 2412 forces the utilization of a predefined blank template that provides for no rich media enhancement of the message. Processing then continues with step 2406 to initialize variables of the present method for later construction of the enhanced rich media e-mail message.

Those of ordinary skill in the art will readily recognize that the collection of templates may be stored in a database as suggested by FIG. 24 or may be stored and retrieved by any of several equivalent storage techniques. FIG. 24 is therefore intended as merely representative of one such technique for retrieving rich media templates.

Figure 25:
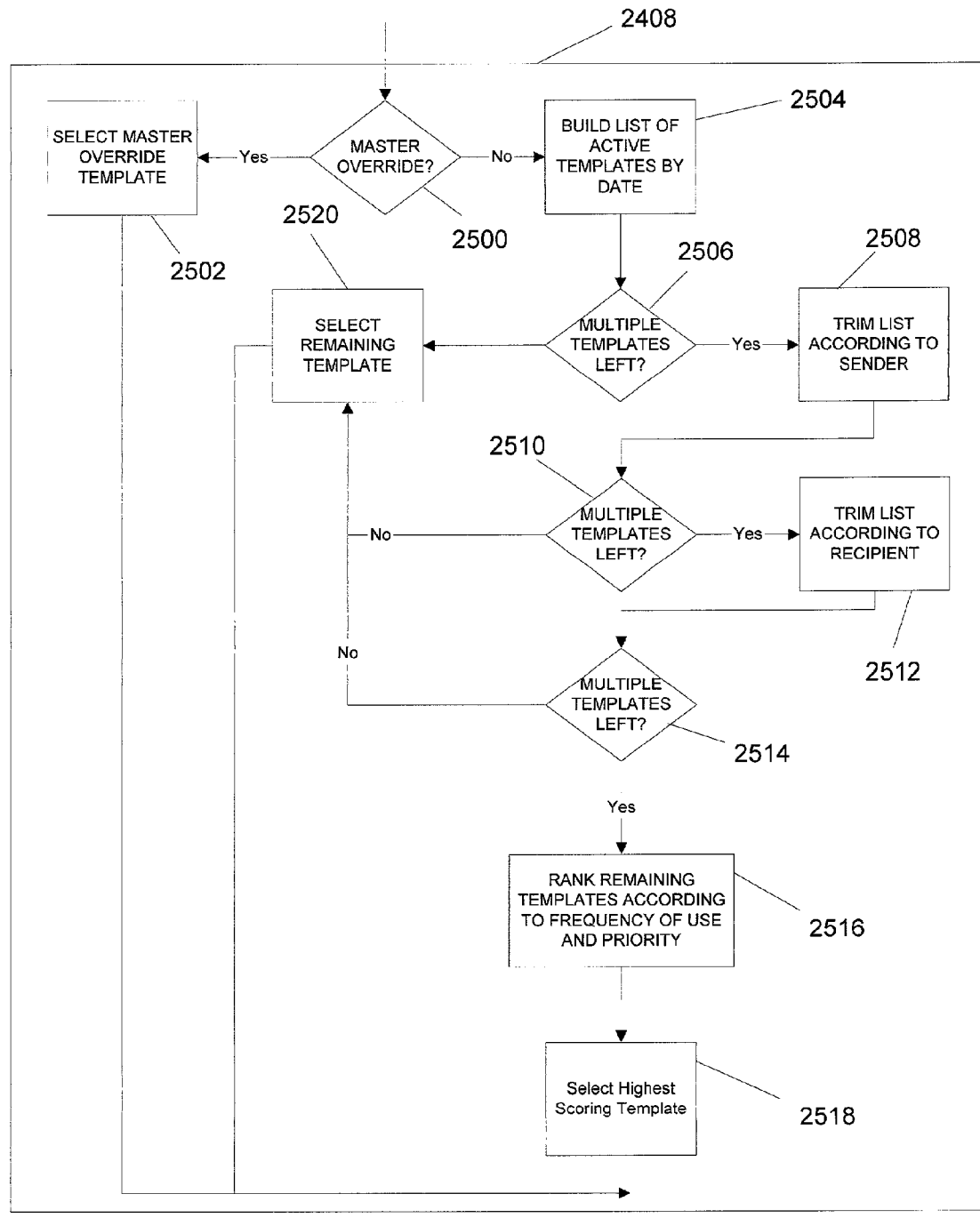
FIG. 25 is a flow diagram illustrating the details of step 2408 of FIG. 24 for automatically selecting a template for enhancement of a message initially shown in FIG. 24.

FIG. 25 provides additional details of step 2408 of FIG. 24. As noted above, step 2408 automatically selects a template for enhancement of a message. The automated selection can, for example, apply a number of rules to enable automated selection of a template from among a plurality of templates appropriate to the message. Step 2500 first determines whether a master override template has been defined by configuration of the e-mail enhancement server processes. Such a global override forces use of a particular template regardless of any other rules used for template selection. If such a master override option is presently set, step 2502 returns the master override template as the automatically selected template. Processing to select a template is then completed.

If no master override is presently configured, step 2504 builds a list of templates that are presently active in accordance with the specified dates of activity. As noted herein, an administrative user can, for example, configure start and end dates for use of a template. In this case, a template is considered active only during the specified period.

Step 2506 then determines whether there are multiple templates on the list so constructed by step 2504. If there are multiple entries, processing continues with step 2508. If there are no entries or only one entry, step 2520 selects the lone remaining template entry from the list or selects the configured default template if there are no entries on the list. Processing is completed by return of the template so selected.

If there are multiple entries on the list as determined during step 2506, step 2508 trims the list of entries that are not permitted for the sender of this message. As noted, rules may be defined to provide only particular templates for a particular sender. With the list so trimmed, step 2510 again tests to determine whether multiple entries remain on the list. If no multiple entries remain on the list, step 2520 selects the lone remaining template or the default template. If it is determined in step 2510 that multiple entries remain on the list of active templates, step 2512 further trims the list to exclude templates not enabled for use by the intended recipient of the e-mail message. Step 2514 then once again tests whether multiple templates remain on the list. If multiple templates do not remain on the list, the process returns to aforedescribed step 2520.

If multiple entries remain as determined in step 2514, step 2516 ranks the entries on the list in accordance with frequency of use and pre-defined delivery priorities. Each template may be assigned with a specified total number of viewings (the number of times the template is used to enhance an e-mail message) by an administrative user. Further, each template may include a definition of its priority relative to other templates. Higher priority templates are sent more frequently as desired over lower priority templates. The ranking process in step 2516 can be configured, for instance, in accordance with a formula based on frequency of use and priority. For example, the index value derived as:

$$((views/total\_views)*priority)$$

where views is the number of times this template has been used to enhance an outbound e-mail message, total_views is the desired number of times this is to be used to enhance messages and priority is the priority value of this template. This computed rank value assigned to each active template on the list is then used in step 2516 to sort the list of remaining templates. The highest ranked template in the list is then selected in step 2518 as the desired template for enhancing the present e-mail message.

Those of ordinary skill in the art will recognize that the exemplary processing of FIG. 25 is representative of one possible automated selection technique. A variety of automated selection techniques will be readily apparent to those of ordinary skill in the art. Any automated selection procedure that applies rules to select from a plurality of possible enhancement templates is considered to be within the scope of the appended claims.

Figure 26:
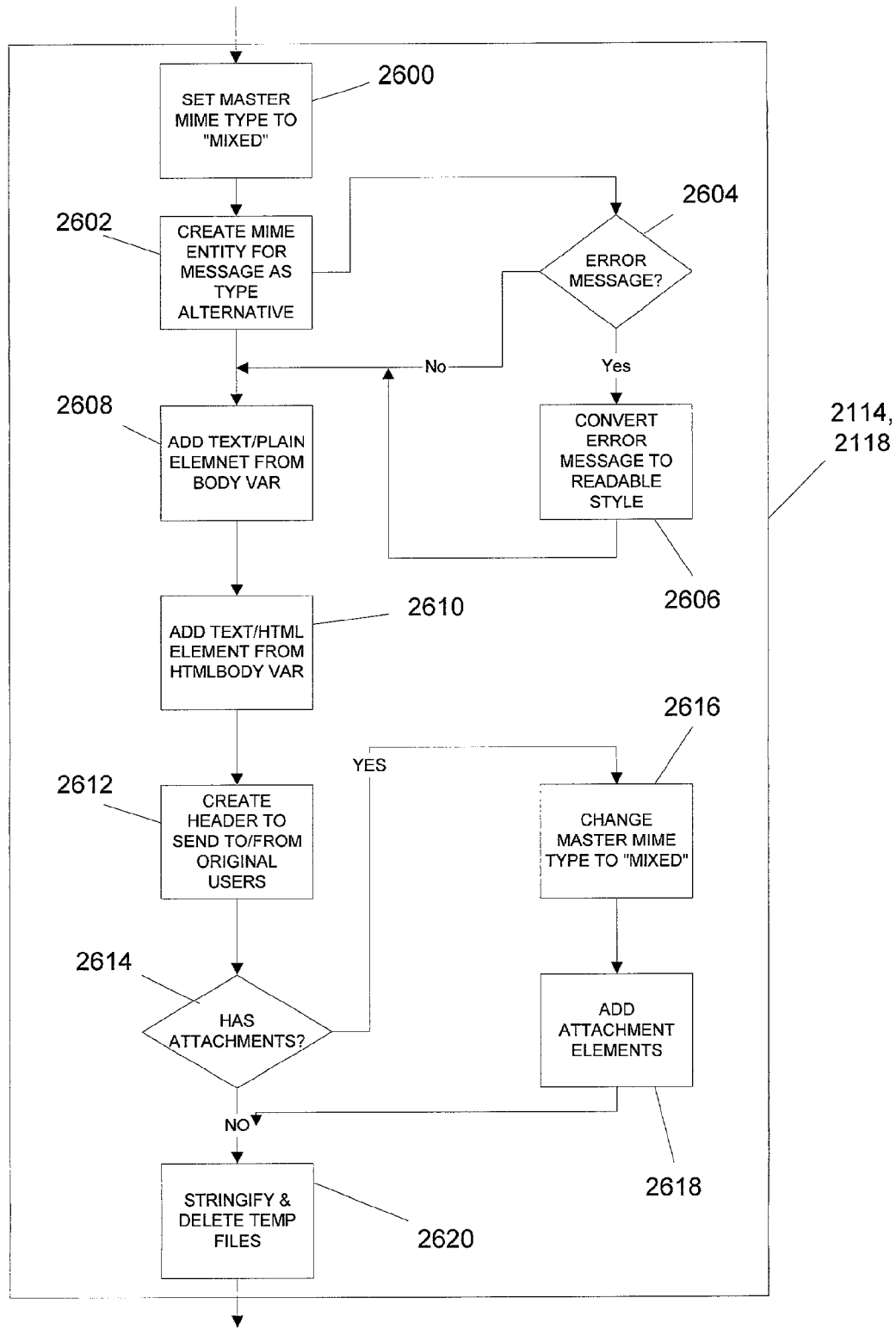
FIG. 26 is a flow diagram illustrating the details of steps 2114 and 2118 of FIG. 21 for building an enhanced rich media version of the e-mail message originally provided by a user or automatically generated by a mailer daemon process indicative of an error condition initially shown in FIG. 21.

FIG. 26 is a flow diagram illustrating steps 2114 and 2118 of FIG. 21 in additional detail. Steps 2114 and 2118 build an enhanced rich media version of the e-mail message originally provided by a user (in the case of step 2114) or automatically generated by a mailer daemon process indicative of an error condition (in the case of step 2118). In particular, step 2600 creates a new rich media multipart MIME format e-mail message and initializes the type of the message to "mixed." Step 2602 then creates the MIME entity for the message having a type "alternative."

Step 2604 then determines whether the invocation of the process is for generation of an enhanced error e-mail message or for a user generated e-mail message. If the process is invoked to generate an enhanced rich media error e-mail message (as is the case for step 2118 of FIG. 21) step 2606 converts the error message portion of the original e-mail message into a more readable style appropriate for the enhanced rich media. In either case, step 2608 then adds the "text/plain" type element(s) previously saved in a BODY variable to the newly generated rich media multipart MIME format e-mail message. Step 2610 likewise adds the "text/HTML" variable from the HTMLBODY variable previously saved in the parsing and cutting operation described above. Step 2612 then creates an appropriate header for the new, enhanced rich media multipart MIME format e-mail message. The newly created header then identifies the "to" and "from" addresses in accordance with information saved by the e-mail client program and local e-mail enhancement server operable in accordance with the present invention as discussed above. Step 2614 then determines whether the original message included attachments as indicated by the count of the number of attachments generated by the parsing and cutting operation described herein above. If the original e-mail message had attachments, step 2616 then changes the type of the multipart MIME message to "mixed." Step 2618 then adds the attachments data from the original message to the newly generated multipart MIME enhanced rich media e-mail message. Step 2620 lastly "stringifies" the newly constructed e-mail message from the information stored in various variables and/or temporary files created as discussed above. The verb "stringify" refers to the conversion of the various elements of the composed message into character strings that may be liberally passed among Internet compatible system. Lastly, step 2620 deletes the temporary files created by the operation of the rich media e-mail enhancement server.

External Enhancement Server Database

As noted above, the external enhancement server process is associated with a database used to log activity by the e-mail server program as well as to store and buffer information related to the status of processing certain requests. Further, information regarding the available templates and their respective status as active or inactive can be stored in the database.

Figure 27:
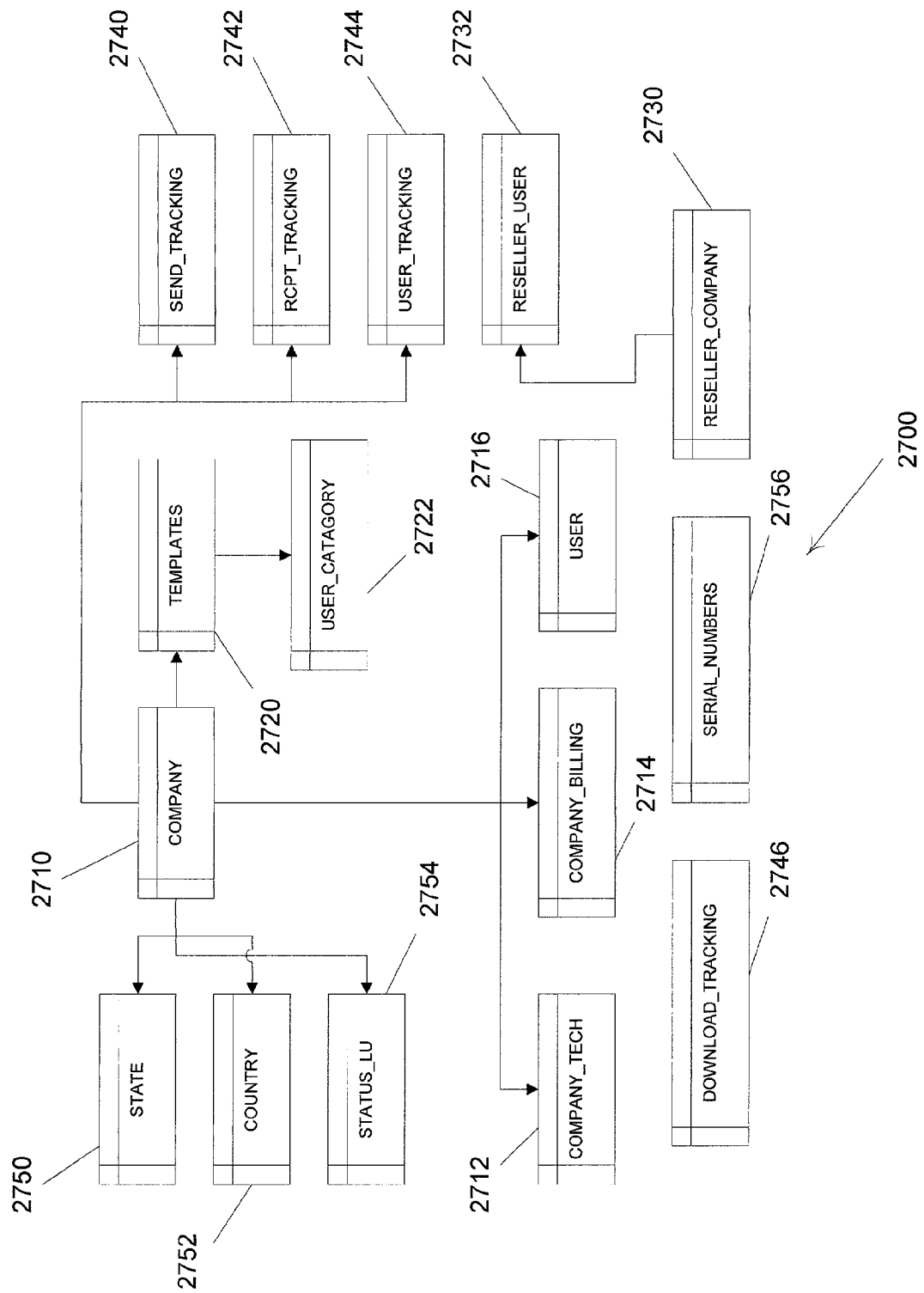
FIG. 27 is a block diagram of an exemplary embodiment of a relational database compatible with the enhanced e-mail messaging system of the present invention.

FIG. 27 is a block diagram of an exemplary embodiment of a relational database compatible with the enhanced e-mail messaging system of the present application. The following list generally describes the purpose of the database items depicted in the diagram of FIG. 27.

i. Company:
ii. This item holds the key data of a company, including, for example, name, address, serial numbers, product versions and other relevant company data. The ID associated with each company becomes a master key for most functions within the system.
1. Company_tech:
2. This item hold the key data gathered about the mail system that a company is running. It is linked to the company table through the company_id.
3. Company_billing:
4. This item hold the key data gathered about billing practices and information. It is linked to the company table through the company_id.
5. User:
6. This item holds the data about a single user for each company. It is built to have a "one to many" relationship with the company table. (One company, many users.) This table holds the username, password, password hints and job title/function of each user.
iii. Templates:
iv. This item holds the relevant data about a single template for a company, including the actual HTML used to make the template, a plain text version of the template and data associated with the actual management of the template.
1. User category:
2. This item is linked the templates table to provide a method for specifying templates by user type. For instance, people in the sales department of a company can be assigned to use template #145, while users in the marketing department might use template #174.
v. Reseller_company:
vi. This item holds the data associated with a system reseller. The ID field becomes a master key for all information regarding resellers.
1. Reseller_user:
2. This item holds the data associated with a single user from a reseller company. Including username & password.
vii. Send_tracking:
viii. Each e-mail that is sent is logged in this item to provide our users with specific details on the number of messages being sent.
ix. Rept_tracking:
x. When a recipient opens a rich media e-mail an open event is logged in this item. This log allows the system to report on the percent of recipients who can receive HTML e-mail, as well as judge the efficacy of an e-mail campaign.
xi. User_tracking:
xii. This item keeps a running log of the users sending messages thru the system.
xiii. Download_tracking:
xiv. This item logs each attempt to download the server application from a specified website.
xv. State:
xvi. US & Canada States and Provinces
xvii. Country:
xviii. Country names.
xix. Status_lu:
xx. The current status of a company or template. Values can be: Active, Pending, Hold and Archived
xxi. Serial_numbers:
xxii. The serial number required to install the server Application.

Figure 28:
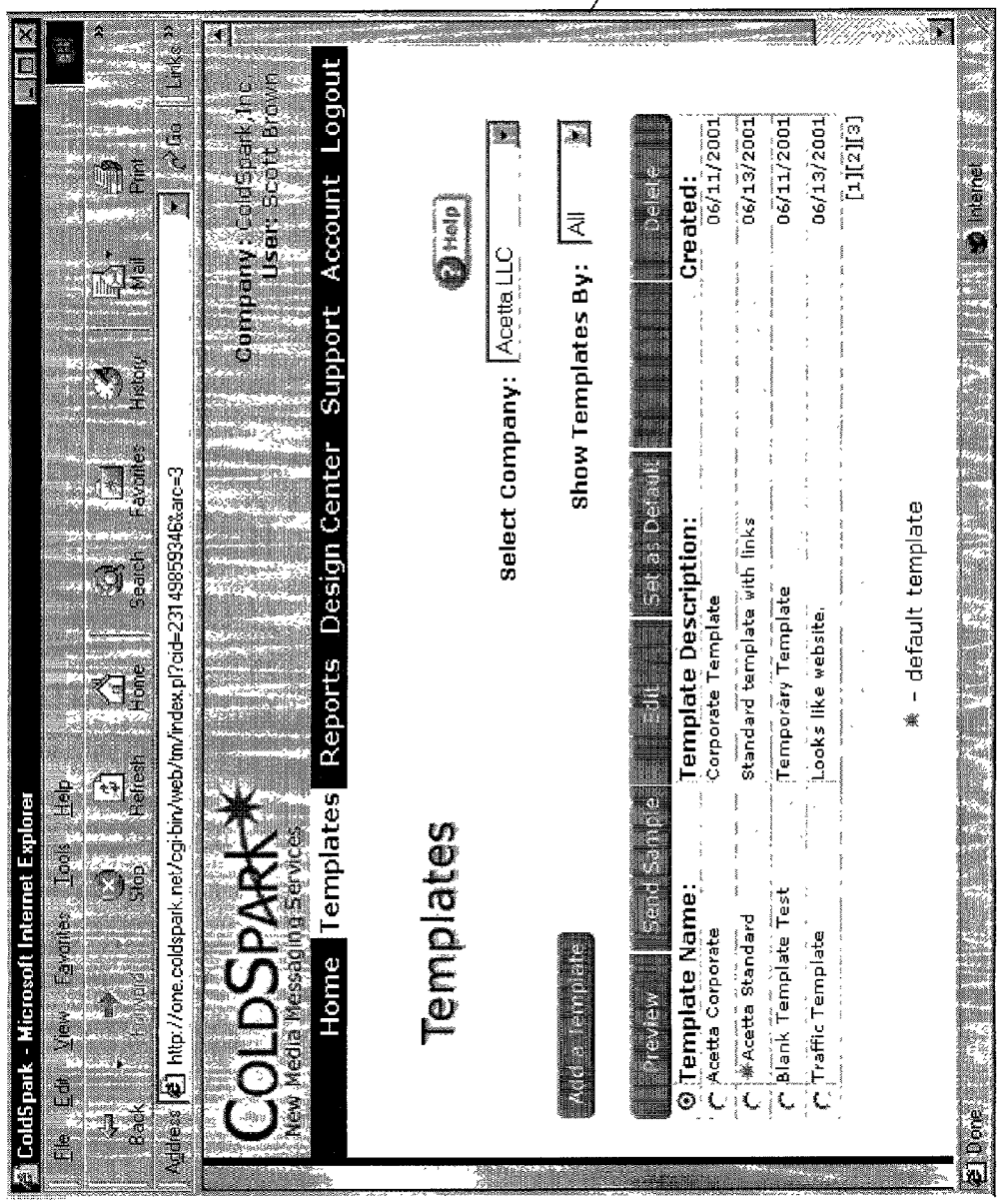
FIG. 28 is an exemplary screen image showing a user interface screen intended to permit an administrative user to manage templates in accordance with the present invention.
Figure 29:
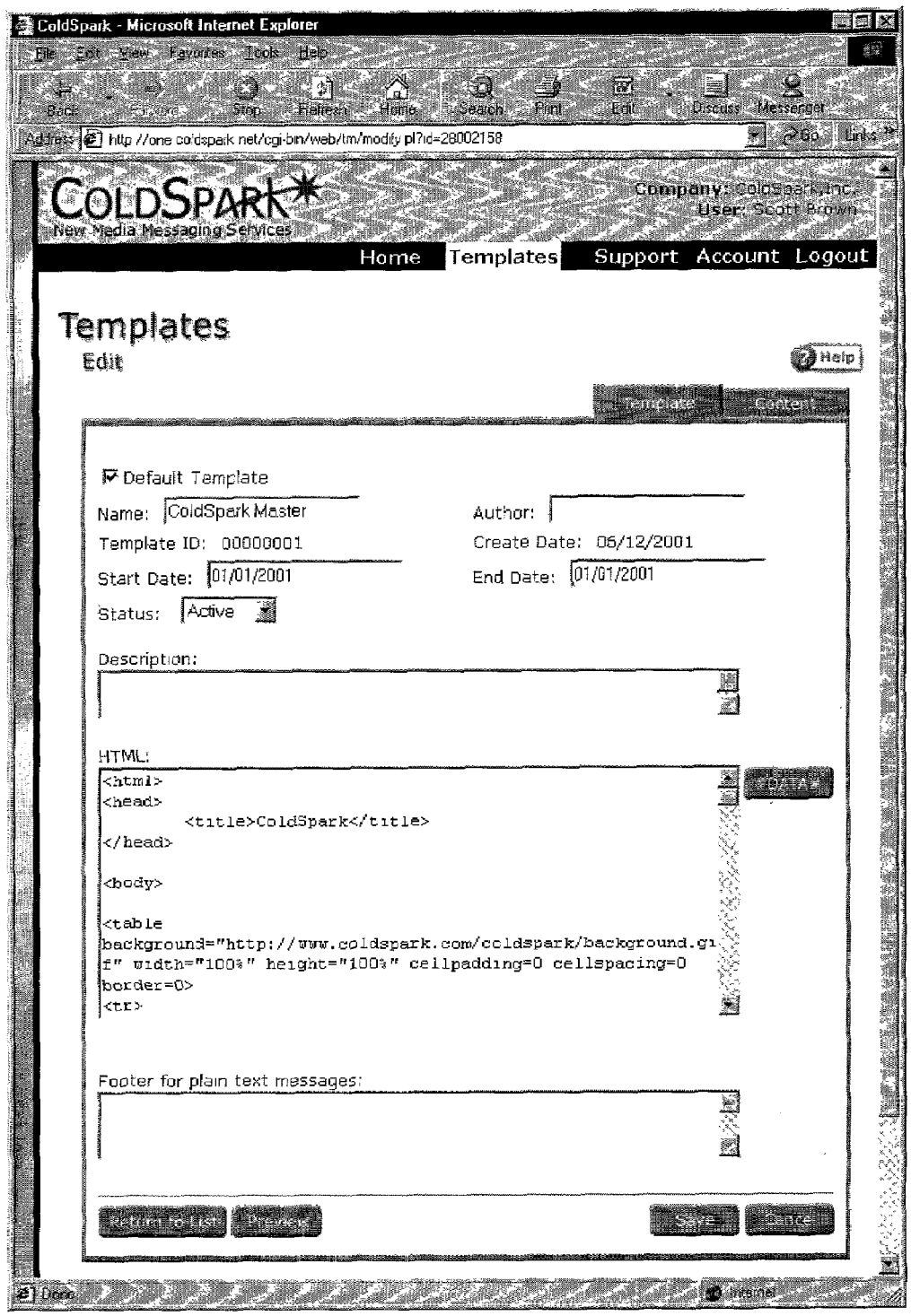
FIG. 29 is an exemplary screen image permitting an administrative user to design a template and set parameters associated with the new/modified template in accordance with the present invention.
Figure 30:
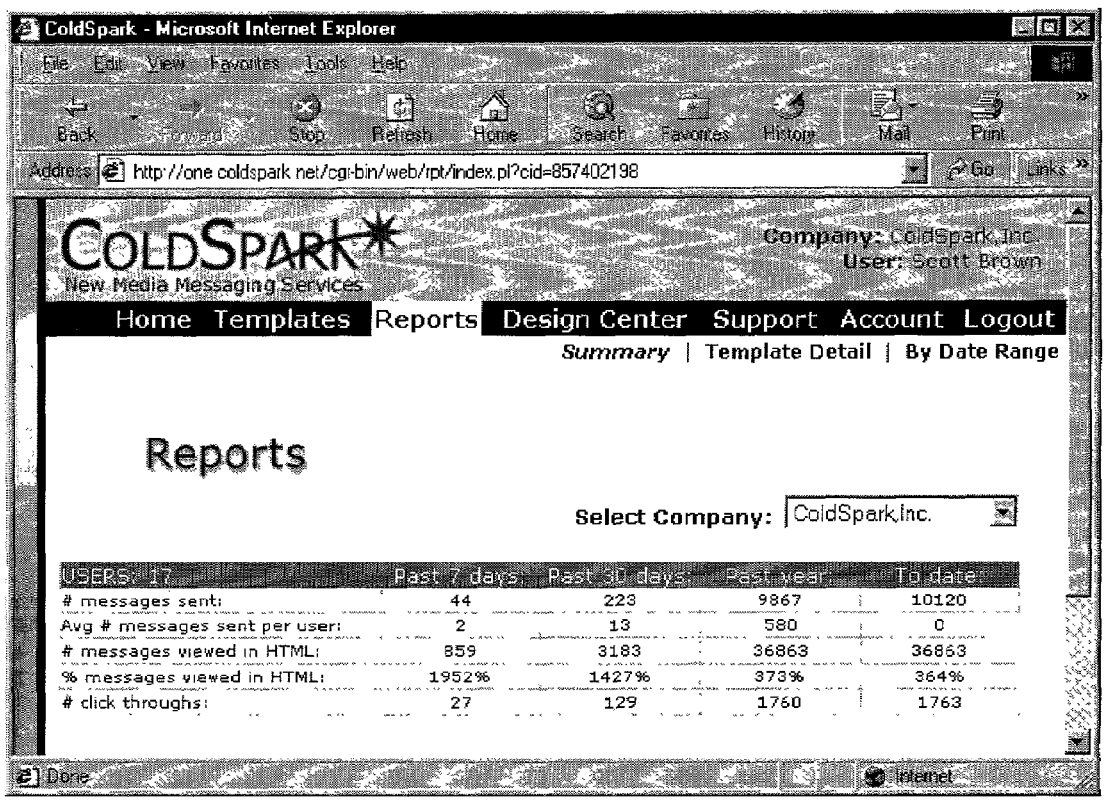
FIG. 30 is an exemplary screen image of a usage report produced in accordance with the present invention.

Those of ordinary skill in the art will recognize that the overall schematic depicted in FIG. 27 is intended merely as exemplary of one embodiment of such a data store used in conjunction with the e-mail messaging system for enhanced rich media delivery of the present invention. Other database structures, as well as non-database storage techniques, will be readily apparent to those of ordinary skill in the art to log information as described above.

Template Administration An administrative user of the external enhancement server process may create templates, manage template selections and specify template selection criteria. FIGS. 28 through 30 are exemplary screen images of user interfaces provided for such an administrative user of the system of the present invention. FIG. 28 is an exemplary screen image of a user interface screen intended to permit an administrative user to manage templates. The administrative user may change start and end dates for active status of the templates. The user may also manually activate or deactivate particular templates, activate them for particular users or groups of users, and define rotation techniques for automatically activating and deactivating templates based on periods of time, frequency of use or other parameters.

FIG. 29 is an exemplary screen image for an administrative user to design a template and set parameters associated with the new/modified template. This exemplary screen permits the administrative user to create the HTML code representing the rich media format desired. The exemplary screen also enables the administrative user to define initial ranges of dates for active status of the new template. As is seen in FIG. 29, a template includes an insertion point indicator to point to the position in the HTML template where the original message text body is to be inserted. In one embodiment, the insertion point indicator is represented as the text string "#DATA#."

Another administrative feature of the present invention permits the administrative user to generate and view reports regarding the usage of each template. FIG. 30 shows an exemplary screen image of such a usage report.

Those of ordinary skill in the art will recognize a wide variety of administrative functions and user interfaces for those functions. Design choices such as the particular administrative feature to which a user is provided access, the security measures associated with permitting such administrative access and the user interface provided for such an administrative user are well-known to those of ordinary skill in the art.

In summary, the invention described herein is considered to represent a new development, which includes a process, a system and computer software that enable standard e-mail messaging systems to enhance e-mail messages with rich media content under a central process.

The importance of the present invention to the current state of the art cannot be overstated. The vast majority of all e-mail currently in circulation (over 95%) is generated from standard multi-user e-mail messaging systems. The value of such systems to the network of users they support, and high cost of any substantial changes to such systems, is such that it is extremely desirable for any process that adds additional capabilities to such systems to be compatible with existing systems' software, hardware and network architecture.

It is equally desirable, if not compulsory in view of the teachings and recognitions herein, for the feasible deployment of rich media in standard multi-user e-mail messaging systems, to provide a system for centralized administration, application and delivery of rich media content across the populations of messages they generate. Such centralization eliminates the many serious disadvantages of PC client-based rich media e-mail solutions including: security risks, network bandwidth loads, high support costs, high rates of user error, poor content integrity, inability to update content consistently, inability to update functionality consistently, and inability to deploy the e-mail message network as a media channel by centrally applying content and measuring viewing and activity rates. Indeed, it is only a central system that resolves these and other issues that offers a feasible solution for corporate multi-user e-mail messaging systems.

Current multi-user e-mail messaging systems do not have the features required for centrally delivering rich media through the messages they generate. Specifically, they lack processing that assigns content enhancements to e-mail messages, rich media content administration tools, a content delivery system and an activity-tracking database. Such features are currently well outside of the range of multi-user e-mail messaging applications, including both clients and servers.

While many current bulk e-mail messaging systems have features that support delivering rich media content through the messages they generate, they do not have the features to support standard multi-user messaging activity, interaction with standard multi-user e-mail messaging systems, or processing to administrate and deliver rich media content in messages generated across a base of individual users.

Similarly, while several web-based e-mail messaging systems offer limited rich media e-mail capabilities to their users, they lack many of the features required for the operation of standard multi-user e-mail messaging systems, the ability to interface with standard multi-user systems and processing to administrate rich media content in the environment of a standard multi-user system. These missing features are considered as rendering the prior art applications to be highly disadvantageous. The present invention overcomes the aforedescribed problems while providing still additional advantages.

Figure 2:
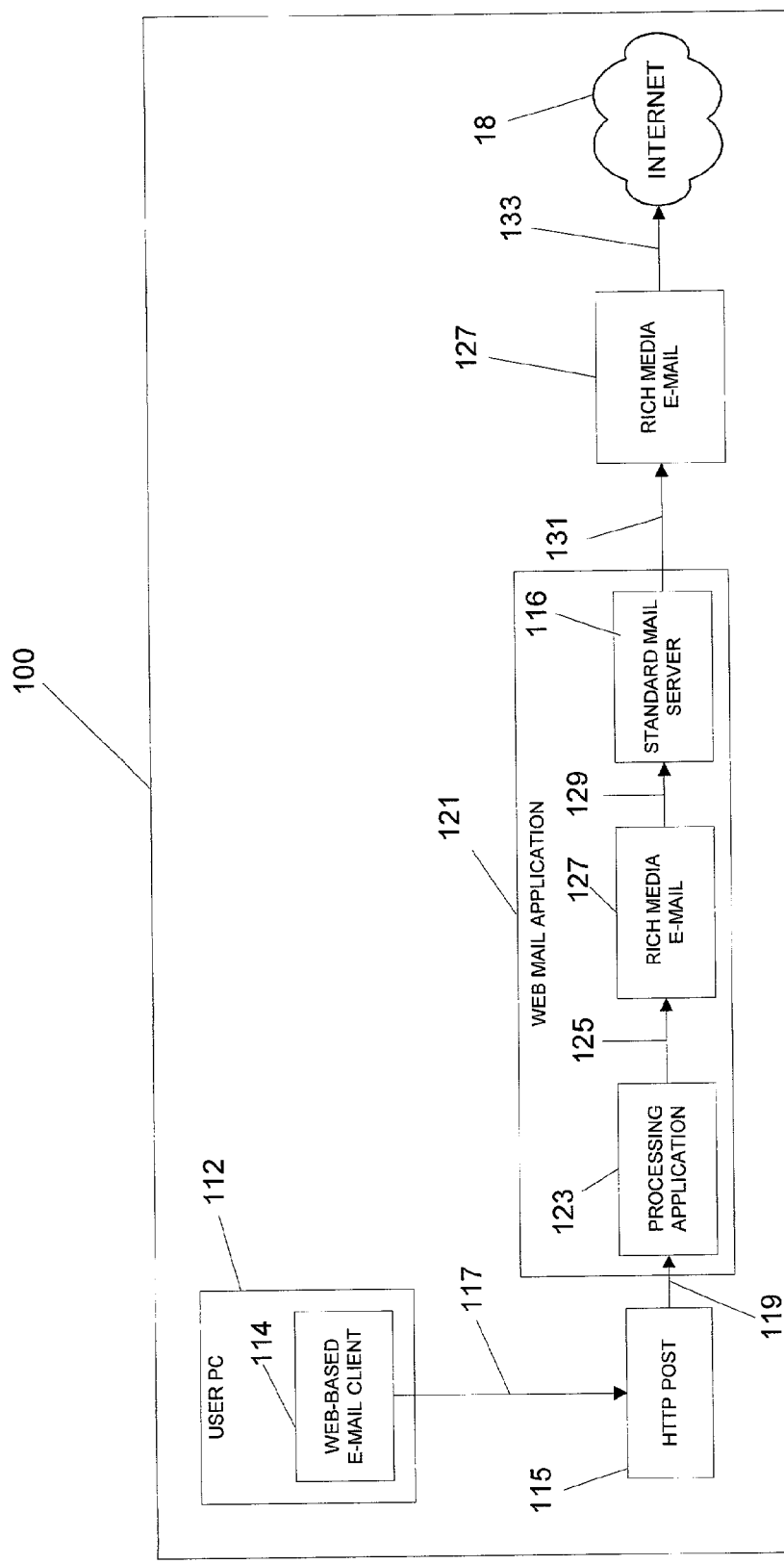
FIG. 2 is a block diagram of a prior art multi-user e-mail messaging system including a Web-based e-mail client add-on application for the addition of rich media content to e-mail messages.
Figure 3:
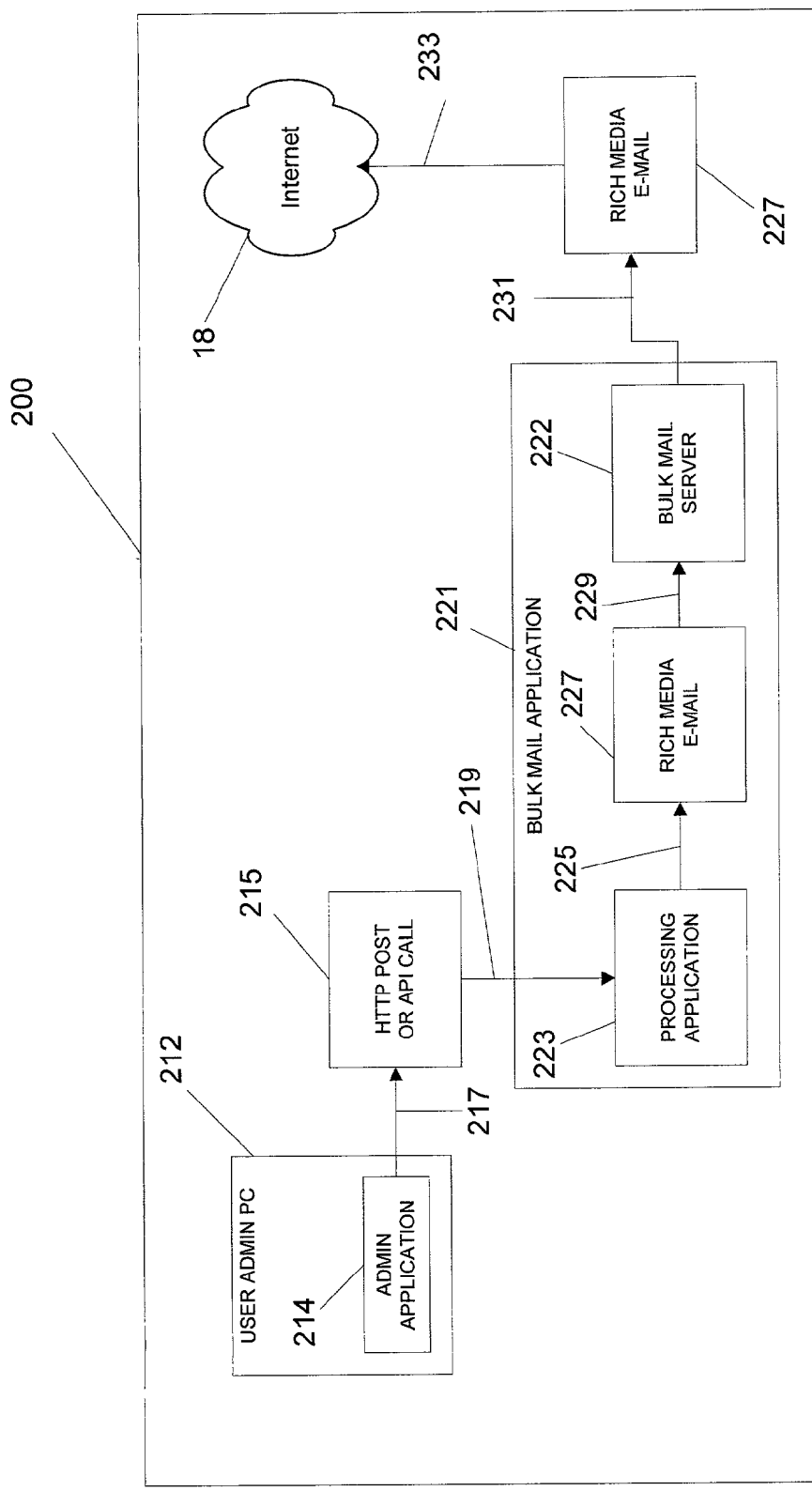
FIG. 3 is a block diagram of a prior art rich media bulk e-mail messaging system including a Web- or PC-based administration application for the addition of rich media content to e-mail messages.

In particular, unlike the prior art e-mail systems illustrated in FIGS. 1-3 and described above, the present invention provides a complete e-mail messaging system including the capability to receive inbound e-mail messages as well as to transmit e-mail messages with rich media content without unnecessarily weighing down the mail server with e-mail messages with large attachments or file content. The e-mail messaging system of the present invention is compatible with standard mail servers, thus eliminating the need for specialized mail servers, such as bulk mail server 222 of FIG. 3, which require expert knowledge to operate. In contrast to prior art rich media e-mail messaging systems, the present invention also allows individual users to readily access rich media content for enhancement of e-mail messages while providing centralized control of the accessibility as well as the allowed content. Furthermore, the present invention may be configured to provide tracking and other information regarding the rich media content access for added security and control. Still further, the present system allows the modification of the accessible rich media content by permitted administrators while preventing unwanted access by unauthorized users. As illustrated, for example, in FIGS. 4-8, the e-mail messaging system of the present invention is flexible in configuration and is compatible with common network security features such as firewalls. Moreover, the present invention provides a highly advantageous enhancement path whereby outbound email messages, that are subject to enhancement, travel along a different message routing path than an inbound message routing path along which inbound messages travel. In particular, the outbound e-mail messages are processed through an enhancement path, which includes a first process containing a routing application and a second process containing a processing application for the selective addition of rich media content to outbound e-mail messages. That is, incoming and outgoing email message paths are comprised of different physical nodes. This configuration is considered as being highly efficient with respect to both inbound and outgoing email messages, inherently producing a number of the advantages described above. Applicants consider that practice of the present invention, in accordance with the teachings herein, provides sweeping advantages over prior art email messaging systems that relate to rich media content.

It should be noted that the present invention is not limited to the embodiments and methods described herein. In one alternative embodiment, the local enhancement server process may interact with a directory system process within a standard multi-user e-mail server in order to add specifications for rich media content based on directory system classifications. In another alternative embodiment, the rich media enhancement server may interact with a bulk e-mail messaging server to add bulk e-mail server capabilities to a standard multi-user e-mail messaging system. In still another alternative embodiment, rich media templates may deliver cookies to recipients' computers, and the rich media enhancement server may specify the delivery of rich media content elements into templates based on items within the cookies. In other possible embodiments, tools for the creation of rich media templates may include processes that facilitate the incorporation and testing of various rich media elements. Such embodiments may include processes for: previewing template contents as they will appear to recipients operating various e-mail client applications (e.g., AOL, Microsoft Outlook, Lotus Notes, etc.); creating and loading streaming audio and video applications to a central server using a process that automates hosting and delivery; customizing and operating interactive tools for conducting polls, surveys, purchasing transactions and other useful exchanges of information and allowing non-expert administrative users to create rich media templates by customizing standard formats.

Furthermore, while the above method for redirecting e-mail messages for processing is one desirable means of routing e-mail messages from a system to enable the centralized application of rich media content, the applications for such a method are not limited to the generation and delivery of rich media e-mail. Such a method could be applied to scan message content, classify messages for centralized storage, apply security features such as encryption or auto-destruct, insert text into messages, measure e-mail message traffic, convert text messages to voice files or for any number of other purposes, which may or may not be conceived of today. Therefore, the present examples are to be considered as illustrative and not restrictive, and the invention is not to be limited to the details given herein, but may be modified within the scope of the appended claims.

What is claimed is:

1. In a multi-user e-mail messaging system interfaced through the Internet and including at least a first user group sharing at least a first server, which first server is, in turn, interfaced to the Internet such that any user of the first user group may compose an e-mail message for transfer to an intended recipient selected as at least one of another user in the first user group and a remote user interfaced to the Internet by a connection other than said first server, said e-mail message including a header section, which contains information regarding the originating user and the intended recipient, a method comprising:

after said e-mail message has been composed and sent via a standard messaging protocol by an originating user of the first user group, directing the e-mail message onto an e-mail enhancement path, including (i) receiving the e-mail message at said first server, (ii) altering the e-mail message including separating and modifying the header section in a predetermined way by inactivating said information regarding the originating user and intended recipient contained in the header section, and adding an alternate header section containing active information regarding an alternate sender and an alternate message recipient, and (iii) directing the altered e-mail message to a second server located on the e-mail enhancement path;

adding additional rich media content to said e-mail message using the e-mail enhancement path to produce an enhanced e-mail message; and thereafter, directing the enhanced e-mail message from the e-mail enhancement path to the intended recipient.

2. The method of claim 1 wherein said inactivating includes adding a predetermined prefix to the originating user and intended recipient information contained in the header section such that said information is inactivated.

3. The method of claim 1 wherein said adding the alternate header section includes specifying said second server as the alternate message recipient.

4. The method of claim 1 wherein said directing the enhanced message to the intended recipient includes
deleting the alternate header section, and
reactivating the originating user and intended recipient information contained in the header section of the e-mail message.

5. In a multi-user e-mail messaging system interfaced through the Internet and including at least a first user group sharing at least a first server, which first server is, in turn, interfaced to the Internet such that any user of the first user group may compose an e-mail message for transfer to an intended recipient selected as at least one of (i) another user in the first user group and (ii) a remote user interfaced to the Internet by a connection other than said first server, said messaging system including a firewall surrounding said first user group and said first server, a method comprising:

prior to sending the e-mail message from a Mail Transport Agent (MTA) via a standard messaging protocol, adding a request for desired additional rich media content to the e-mail message and placing the email message en route to the intended recipient using the MTA, thereby directing the e-mail message to a first location inside the firewall;

at the first location, identifying the request for desired additional rich media content in the e-mail message and providing a validation of the request for desired additional rich media content according to a predetermined set of rules;

forwarding the e-mail message to a second location outside the firewall;

at the second location, adding the desired additional rich media content to said e-mail message responsive to said validation to produce an enhanced e-mail message; and thereafter, redirecting the enhanced e-mail message to the intended recipient.

6. The method of claim 5, wherein adding the request for desired additional rich media content occurs after the e-mail message has been sent via the standard messaging protocol of Simple Mail Transfer Protocol ("SMTP").

* * * * *

UNITED STATES PATENT AND TRADEMARK OFFICE
CERTIFICATE OF CORRECTION

PATENT NO.         : 7,584,251 B2                                              Page 1 of 1
APPLICATION NO. : 09/939136
DATED              : September 1, 2009
INVENTOR(S)        : Scott T. Brown et al.

It is certified that error appears in the above-identified patent and that said Letters Patent is hereby corrected as shown below:

In Column 9, Line 42
   Replace "would" with --world--

In Column 24, Line 17
   Replace "t" with --the--

In Column 25, Line 52
   Replace "used" with --use--

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,584,251 B2  Page 1 of 1
APPLICATION NO. : 09/939136
DATED : September 1, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1711 days.

Signed and Sealed this

Fourteenth Day of September, 2010

David J. Kappos
*Director of the United States Patent and Trademark Office*